United States Patent
Okazaki

(10) Patent No.: US 9,724,633 B2
(45) Date of Patent: Aug. 8, 2017

(54) CERAMIC HONEYCOMB STRUCTURE AND ITS PRODUCTION METHOD

(71) Applicant: HITACHI METALS, LTD., Minato-ku, Tokyo (JP)

(72) Inventor: Shunji Okazaki, Fukuoka (JP)

(73) Assignee: HITACHI METALS, LTD., Tokyo (JP)

( * ) Notice: Subject to any disclaimer, the term of this patent is extended or adjusted under 35 U.S.C. 154(b) by 175 days.

(21) Appl. No.: 14/718,665

(22) Filed: May 21, 2015

(65) Prior Publication Data

US 2015/0251124 A1    Sep. 10, 2015

Related U.S. Application Data

(62) Division of application No. 13/391,216, filed as application No. PCT/JP2010/065068 on Sep. 2, 2010, now Pat. No. 9,074,504.

(30) Foreign Application Priority Data

Sep. 4, 2009    (JP) ................................. 2009-205153

(51) Int. Cl.
*B01D 46/24* (2006.01)
*C04B 38/00* (2006.01)
(Continued)

(52) U.S. Cl.
CPC ..... *B01D 46/2429* (2013.01); *B01D 39/2068* (2013.01); *B01D 46/0001* (2013.01);
(Continued)

(58) Field of Classification Search
CPC combination set(s) only.
See application file for complete search history.

(56) References Cited

U.S. PATENT DOCUMENTS

| 4,632,683 A | 12/1986 | Fukutani et al. |
| 5,069,697 A | 12/1991 | Hamaguchi et al. |

(Continued)

FOREIGN PATENT DOCUMENTS

| CN | 1900493 A | 1/2007 |
| JP | 61-129015 A | 6/1986 |

(Continued)

OTHER PUBLICATIONS

Communication dated Jun. 30, 2015 from the Japanese Patent Office in counterpart application No. 2014-084596.

(Continued)

*Primary Examiner* — David Sample
*Assistant Examiner* — Nicholas W Jordan
(74) *Attorney, Agent, or Firm* — Sughrue Mion, PLLC

(57) ABSTRACT

A method for producing a honeycomb-shaped ceramic structure by extrusion-molding a moldable material including a cordierite-forming material and a pore-forming material, wherein the cordierite-forming material contains 15-25% by mass of silica having an average particle size of 20-30 μm, with 5% or less by mass of particles having particle sizes of 10 μm or less and 5% or less by mass of particles having particle sizes of 100 μm or more, a particle size distribution deviation SD of 0.5 or less, and sphericity of 0.5 or more, and wherein the pore-forming material is present in an amount of 5-40% by mass based on the cordierite-forming material and has an average particle size of 15-50 μm, with 10% or less by mass of particles having particle sizes of 5 μm or less and 5% or less by mass of particles having particle sizes of 80 μm or more.

12 Claims, 4 Drawing Sheets

(51) Int. Cl.
    *C04B 35/195*     (2006.01)
    *C04B 38/06*     (2006.01)
    *F01N 3/022*     (2006.01)
    *B01D 39/20*     (2006.01)
    *B01D 46/00*     (2006.01)
    *C04B 111/00*     (2006.01)

(52) U.S. Cl.
    CPC ........ *C04B 35/195* (2013.01); *C04B 38/0006* (2013.01); *C04B 38/0009* (2013.01); *C04B 38/067* (2013.01); *C04B 38/068* (2013.01); *F01N 3/0222* (2013.01); *B01D 2046/2433* (2013.01); *B01D 2046/2437* (2013.01); *B01D 2239/125* (2013.01); *B01D 2239/1208* (2013.01); *B01D 2239/1216* (2013.01); *B01D 2239/1258* (2013.01); *C04B 2111/0081* (2013.01); *C04B 2111/00793* (2013.01); *C04B 2235/3217* (2013.01); *C04B 2235/3418* (2013.01); *C04B 2235/3445* (2013.01); *F01N 2330/06* (2013.01); *Y02T 10/20* (2013.01); *Y10T 428/24149* (2015.01)

(56) References Cited

U.S. PATENT DOCUMENTS

| | | |
|---|---|---|
| 5,545,243 A | 8/1996 | Kotani et al. |
| 5,733,352 A | 3/1998 | Ogawa et al. |
| 7,319,114 B2 | 1/2008 | Ohmura et al. |
| 7,485,594 B2 | 2/2009 | Saha et al. |
| 7,528,087 B2 | 5/2009 | Saha et al. |
| 8,500,840 B2 | 8/2013 | Okazaki et al. |
| 8,636,821 B2 | 1/2014 | Okazaki |
| 2002/0198104 A1 | 12/2002 | Nishimura et al. |
| 2003/0041574 A1 | 3/2003 | Noguchi et al. |
| 2003/0093982 A1 | 5/2003 | Suwabe et al. |
| 2003/0165662 A1 | 9/2003 | Suwabe et al. |
| 2003/0166450 A1 | 9/2003 | Kumazawa et al. |
| 2004/0091709 A1 | 5/2004 | Ohmura et al. |
| 2006/0197265 A1 | 9/2006 | Saha et al. |
| 2007/0045909 A1 | 3/2007 | Watanabe et al. |
| 2007/0203315 A1 | 8/2007 | Saha et al. |
| 2007/0213207 A1 | 9/2007 | Saha et al. |
| 2007/0259153 A1* | 11/2007 | Noguchi ............... C04B 35/195 428/116 |
| 2008/0124516 A1 | 5/2008 | Noguchi et al. |
| 2009/0011176 A1 | 1/2009 | Ichikawa |
| 2009/0011919 A1 | 1/2009 | Noguchi et al. |
| 2009/0065982 A1 | 3/2009 | Morimoto et al. |
| 2009/0226347 A1 | 9/2009 | Bardon et al. |
| 2010/0180561 A1 | 7/2010 | Beall et al. |
| 2010/0205921 A1 | 8/2010 | Okazaki et al. |
| 2011/0135873 A1 | 6/2011 | Okazaki et al. |

FOREIGN PATENT DOCUMENTS

| | | |
|---|---|---|
| JP | 7-163823 A | 6/1995 |
| JP | 2002-121084 A | 4/2002 |
| JP | 2002-219319 A | 8/2002 |
| JP | 2002-349234 A | 12/2002 |
| JP | 2002-355511 A | 12/2002 |
| JP | 2003-040687 A | 2/2003 |
| JP | 2004-360654 A | 12/2004 |
| JP | 2005103469 A | 4/2005 |
| JP | 2005-530616 A | 10/2005 |
| JP | 2006-524630 A | 11/2006 |
| JP | 2007-045686 A | 2/2007 |
| JP | 2008-308378 A | 12/2008 |
| WO | 02072671 A2 | 9/2002 |
| WO | 2004/002608 A1 | 1/2004 |
| WO | 2005090262 A1 | 9/2005 |
| WO | 2006/095835 A1 | 9/2006 |
| WO | 2007/108428 A1 | 9/2007 |
| WO | 2009/048156 A1 | 4/2009 |

OTHER PUBLICATIONS

First Office Action issued by the State Intellectual Property Office of People's Republic of China in corresponding CN Application No. 201080037669.8, dated Nov. 18, 2013.

International Search Report of PCT/JP2010/065068, dated Dec. 7, 2010.

Japanese Office Action for corresponding Application No. 2011-529946 dated Feb. 18, 2014, 8 pages.

* cited by examiner

CERAMIC HONEYCOMB STRUCTURE AND ITS PRODUCTION METHOD

CROSS REFERENCE TO RELATED APPLICATION

This application is a divisional of application Ser. No. 13/391,261 filed Feb. 17, 2012, which is the National Stage of International Application No. PCT/JP2010/065068 filed Sep. 2, 2010 (claiming priority based on Japanese Patent Application No. 2009-205153 filed Sep. 4, 2009), the contents of which are incorporated herein by reference in their entirety.

FIELD OF THE INVENTION

The present invention relates to a ceramic honeycomb structure for constituting a ceramic honeycomb filter for removing fine particles from exhaust gases discharged from diesel engines.

BACKGROUND OF THE INVENTION

An exhaust gas discharged from diesel engines contains particulate matter (PM) comprising as main components carbonaceous soot and soluble organic fractions (SOFs) comprising high-boiling-point hydrocarbon components, which are likely to adversely affect humans and environment when discharged into the air. Accordingly, ceramic honeycomb filters have conventionally been attached to exhaust pipes of diesel engines for removing PM.

One example of ceramic honeycomb filters for capturing PM in the exhaust gas is shown in FIGS. 1 and 2. The ceramic honeycomb filter 10 comprises a ceramic honeycomb structure comprising porous cell walls 2 defining a large number of outlet-side-sealed flow paths 3 and inlet-side-sealed flow paths 4 and a peripheral wall 1, and upstream-side plugs 6a and downstream-side plugs 6c sealing the exhaust-gas-inlet-side end surface 8 and exhaust-gas-outlet-side end surface 9 of the flow paths 3 and 4 alternately in a checkerboard pattern. The peripheral wall 1 of the ceramic honeycomb filter is fixed by grip members (not shown) of metal meshes or ceramics mats, etc. to prevent movement during operation, and disposed in a metal container (not shown).

In the ceramic honeycomb filter 10, an exhaust gas is cleaned as follows. As shown by dotted arrows in FIG. 2, an exhaust gas flows into the outlet-side-sealed flow paths 3 opening on the inlet-side end surface 8. While passing through the cell walls 2, particularly through communicating pores on and in the cell walls 2, PM in the exhaust gas is captured. The cleaned exhaust gas flows from the inlet-side-sealed flow paths 4 opening on the exhaust-gas-outlet-side end surface 9 to the air.

PM continuously captured by the cell walls 2 clogs communicating pores on and in the cell walls 2, resulting in increased pressure loss when the exhaust gas passes through the ceramic honeycomb filter. Accordingly, PM should be burned off to regenerate the ceramic honeycomb filter before the pressure loss reaches a predetermined level.

The ceramic honeycomb filter should meet the requirements of a high capturing ratio of fine particles and low pressure loss. However, because these requirements are in a contradictory relation, the optimization of the porosity, volume, size, etc. of pores on the cell wall surface to meet both requirements have conventionally been investigated.

JP 2005-530616 A discloses a ceramic filter constituted by a cordierite honeycomb structure with ends plugged for capturing and burning fine particles discharged from diesel engines, d50/(d50+d90) determined from a pore diameter distribution being less than 0.70, a permeability factor Sf when soot is accumulated, which is defined by the formula of [d50/(d50+d90)]/[porosity (%)/100], being less than 1.55, and a thermal expansion coefficient (25° C. to 800° C.) being $17 \times 10^{-7}$/° C. or less, describing that with such a pore structure (pore size distribution and the communications of pores), small pressure loss can be kept even when carbon soot is accumulated.

JP 2002-219319 A discloses a porous honeycomb filter formed by a material whose main crystal phase is cordierite having a controlled pore size distribution, the pore size distribution being such that the volume of pores having diameters of less than 10 μm is 15% or less of the total pore volume, the volume of pores having diameters of 10-50 μm is 75% or more of the total pore volume, and the volume of pores having diameters exceeding 50 μm is 10% or less of the total pore volume. JP 2002-219319 A describes that because of the above pore size distribution, this porous honeycomb filter has high efficiency of capturing PM, etc., with suppressed pressure loss increase due to the clogging of pores. JP 2002-219319 A also describes that such pore size distribution can be controlled by adjusting the particle size of a silica component, one of cordierite-forming materials, and by lowering the concentration of kaolin.

JP 61-129015 A discloses an exhaust-gas-cleaning filter having small pores having diameters of 5-40 μm and large pores having diameters of 40-100 μm on at least inlet path surfaces of cell walls, the number of small pores being 5-40 times that of large pores, pores on the surface communicating with pores inside the cell walls. JP 61-129015 A describes that this exhaust-gas-cleaning filter always exhibits high, substantially constant efficiency of capturing fine particles.

JP 2003-40687 A discloses a ceramic honeycomb structure composed of cordierite as a main component, and having porosity of 55-65% and an average pore diameter of 15-30 μm, the total area of pores opening on the cell wall surface being 35% or more of the total cell wall surface area. JP 2003-40687 A describes that this honeycomb ceramic structure exhibits high capturing efficiency with low pressure loss.

JP 2002-355511 A discloses an exhaust-gas-cleaning filter comprising a ceramic honeycomb structure having a catalyst carried on the cell wall surface, the cell walls having porosity of 55-80%, and the total area of pores opening on the cell wall surface being 20% or more of the total cell wall surface area. JP 2002-355511 A describes that with increased contact area between the catalyst carried on the cell walls and the accumulated PM, this exhaust-gas-cleaning filter exhibits high performance of oxidizing PM by the catalyst with suppressed pressure loss increase.

JP 2002-349234 A discloses an exhaust-gas-cleaning filter having a catalyst carried, the total area of pores opening on the cell wall surface being 30% or more of the total cell wall surface area, the total opening area of large pores having opening diameters of 30 μm or more being 50% or more of the total opening pore area. JP 2002-349234 A describes that such structure provides drastically improved burning efficiency of PM, while preventing damage due to thermal stress.

However, the exhaust-gas-cleaning filters described in JP 2005-530616 A, JP 2002-219319 A, JP 61-129015 A, JP 2003-40687 A, JP 2002-355511 A, and JP 2002-349234 A exhibit PM-capturing performance, which becomes high by the accumulation of PM to some extent, but is not necessarily sufficient at an early stage of use before PM is accumulated (when the ceramic honeycomb filter starts to be freshly used or reused after regeneration). Particularly they fail to capture harmful, nano-sized PM sufficiently, but discharge it, causing a serious problem under the strengthened exhaust gas regulations.

To solve these problems, JP 2004-360654 A discloses a ceramic honeycomb filter whose cell walls have porosity of 55-75% and an average pore diameter of 15-40 µm, the total area of pores opening on the cell wall surface being 10-30% of the total cell wall surface area, and pores having equivalent circle diameters of 5-20 µm being 300/mm² or more among those opening on the cell wall surface. However, even the ceramic honeycomb filter described in JP 2004-360654 A fails to solve the problem of low PM-capturing efficiency at an early stage of use after its regeneration.

As a method for producing a porous ceramic structure having stable porosity, JP 2007-45686 A discloses the use of porous resin particles having an average particle size of 10-50 µm and porosity of 50-90% as a pore-forming material. JP 2007-45686 A describes that the use of porous resin particles generating less heat when burned than solid particles and more resistant to collapse than hollow particles as a pore-forming material can suppress the collapse of pore-forming material particles during the mixing and blending of the molding material, and excessive heat generation during sintering, thereby producing a porous ceramic structure with stable porosity at a high yield. However, when the porous resin particles are used as a pore-forming material, high pressure is needed in the extrusion molding because of friction resistance among the pore-forming material particles, likely resulting in the deformation of extrudates and dies.

OBJECT OF THE INVENTION

An object of the present invention is to provide a ceramic honeycomb structure having an improved PM-capturing ratio at an early stage of use after the regeneration of a ceramic honeycomb filter, with suppressed pressure loss increase when PM is captured, and its production method.

DISCLOSURE OF THE INVENTION

Thus, the ceramic honeycomb structure of the present invention has a large number of flow paths partitioned by porous cell walls, the cell walls having porosity of 40-60%;

pores opening on the cell wall surface having an opening area ratio (the total opening area of pores opening on the cell wall surface per a unit area) of 15% or more;

when the opening diameter of each pore opening on the cell wall surface is expressed by an equivalent circle diameter (a diameter of a circle having the same area as the opening area of each pore), the median opening diameter of the opening pores being 10 µm or more and less than 40 µm;

the density of pores having equivalent circle diameters of 10 µm or more and less than 40 µm being 350/mm² or more; and the average circularity of pores having equivalent circle diameters of 10 µm or more and less than 40 µm being 1-2.

The cell walls preferably have a Darcy's coefficient of permeability of $0.1 \times 10^{-12}$ m² to $2 \times 10^{-12}$ m².

It is preferable that when the pore diameters of the cell walls are measured by mercury porosimetry, the median pore diameter is 5 µm or more and less than 20 µm, that the volume of pores having diameters of less than 2 µm is 10% or less of the total pore volume, that the volume of pores having diameters of 40 µm or more is 10% or less of the total pore volume; and that the pore size distribution deviation $\sigma = \log(D_{20}) - \log(D_{80})$ is 0.5 or less, wherein $D_{20}$ represents a pore diameter (µm) at a pore volume corresponding to 20% of the total pore volume, and $D_{80}$ similarly represents a pore diameter (µm) at a pore volume corresponding to 80% of the total pore volume, on a curve showing the relation between a pore diameter and a cumulative pore volume obtained by accumulating a pore volume from the maximum pore diameter to a particular pore diameter, and $D_{80} < D_{20}$.

The ceramic honeycomb structure is preferably alternately plugged on exhaust gas inlet or outlet sides of the flow paths, for use as a filter.

The ceramic honeycomb structure preferably has an average cell wall thickness of 9.0-12 mil and an average cell density of 150-300 cpsi.

The ceramic honeycomb structure preferably has a thermal expansion coefficient of $13 \times 10^{-7}$/° C. or less between 20° C. and 800° C.

The method of the present invention for producing a honeycomb-shaped ceramic structure by extrusion-molding a moldable material comprising a cordierite-forming material and a pore-forming material, is characterized in that:

the cordierite-forming material contains 15-25% by mass of silica;

the silica has an average particle size of 20-30 µm with 5% or less by mass of particles having particle sizes of 10 µm or less, and 5% or less by mass of particles having particle sizes of 100 µm or more, a particle size distribution deviation $SD = \log(d_{80}) - \log(d_{20})$ of 0.5 or less, and sphericity of 0.5 or more, wherein $d_{20}$ represents a particle size (µm) at a cumulative volume corresponding to 20% of the total volume, and $d_{80}$ similarly represents a particle size (µm) at a cumulative volume corresponding to 80% of the total volume, on a curve showing the relation between a particle size and a cumulative volume of particles having a particular particle size or less, and $d_{20} < d_{80}$;

the amount of the pore-forming material is 5-40% by mass based on the cordierite-forming material; and the pore-forming material having an average particle size of 15-50 µm, with 10% or less by mass of particles having particle sizes of 5 µm or less, and 5% or less by mass of particles having particle sizes of 80 µm or more, a particle size distribution deviation SD of 0.5 or less, and sphericity of 0.5 or more.

It is preferable that the pore-forming material is a porous polymer, and that the pore-forming material particles have 30% or more and less than 50% of voids.

80% or more of voids in the pore-forming material particles preferably contain water.

The cordierite-forming material preferably contains 40-43% by mass of talc, the talc having an average particle size of 1-10 µm, d90 (a particle size at a cumulative volume corresponding to 90% of the total volume on a curve showing the relation between a particle size and a cumulative volume of particles having a particular particle size or less) of 30 µm or less, and a particle size distribution deviation SD of 0.7 or less.

The talc particles preferably have a morphology index (indicating the degree of platelikeness or platiness) of 0.77 or more.

DESCRIPTION OF THE PREFERRED EMBODIMENTS

[1] Ceramic Honeycomb Structure (1) Structure

The ceramic honeycomb structure of the present invention has a large number of flow paths partitioned by porous cell walls, the cell walls having porosity of 40-60%;

pores opening on the cell wall surface having an opening area ratio (the total opening area of pores opening on the cell wall surface per a unit area) of 15% or more;

when the opening diameter of each pore opening on the cell wall surface is expressed by an equivalent circle diameter (a diameter of a circle having the same area as the opening area of each pore), the median opening diameter of the opening pores being 10 μm or more and less than 40 μm;

the density of pores having equivalent circle diameters of 10 μm or more and less than 40 μm being 350/mm² or more; and the average circularity of pores having equivalent circle diameters of 10 μm or more and less than 40 μm being 1-2.

With such structure, the ceramic honeycomb structure of the present invention exhibits an improved PM-capturing ratio at an early stage of use after regeneration, with suppressed pressure loss increase when PM is captured.

(i) Porosity

The cell walls having porosity of less than 40% provides large pressure loss, failing to keep low pressure loss while capturing PM. On the other hand, the porosity exceeding 60% provides a low PM-capturing ratio at an early stage of use after regeneration. The porosity of the cell walls is preferably 43-57%, more preferably 45-55%.

(ii) Opening Area Ratio

The opening area ratio of pores opening on the cell wall surface means the total opening area of pores opening per a unit area of the cell wall surface. The opening area ratio is determined by measuring the total opening area of pores on an electron photomicrograph of a cell wall surface by an image analyzer (for example, Image-Pro Plus ver. 3.0 available from Media Cybernetics), and dividing the total opening area by the field area.

When the opening area ratio is less than 15%, it is difficult to keep low pressure loss while capturing PM. To prevent the PM-capturing ratio from lowering at an early stage of use after regeneration, the opening area ratio is preferably 40% or less. The opening area ratio is more preferably 18-38%.

(iii) Median Opening Diameter

Figure 1:
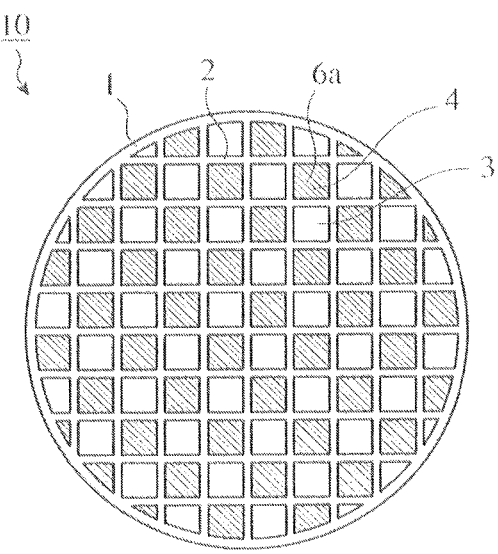
FIG. 1 is a front view showing one example of ceramic honeycomb filters.
Figure 2:
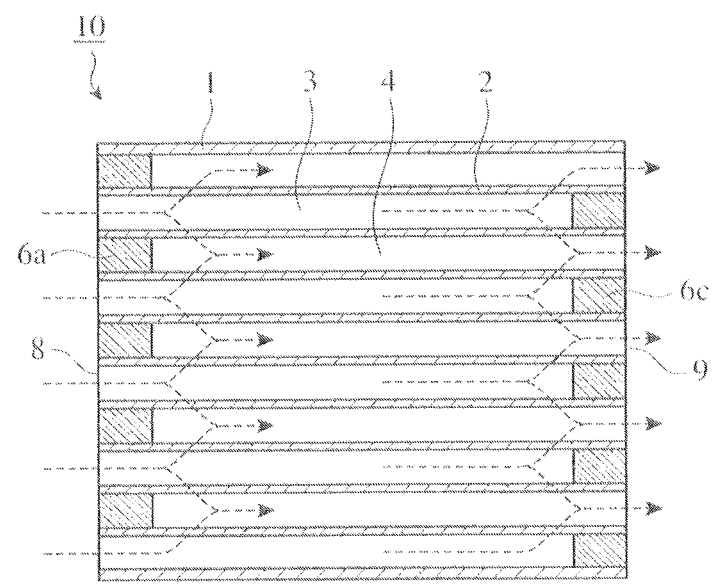
FIG. 2 is a schematic cross-sectional view showing one example of ceramic honeycomb filters.
Figure 3:
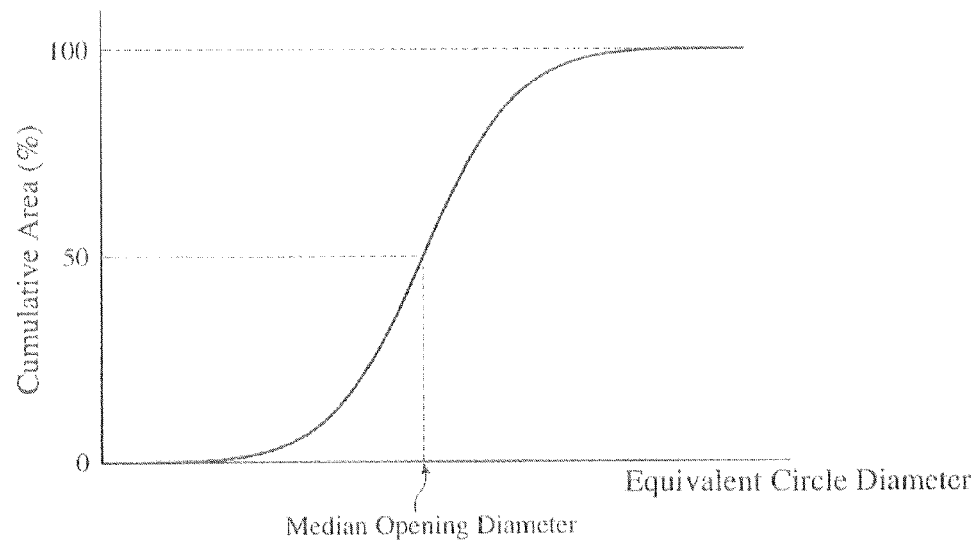
FIG. 3 is a graph schematically showing the relation between an equivalent circle diameter and a cumulative area in pores opening on the cell wall surface of a ceramic honeycomb structure.

In a graph shown in FIG. 3, in which the cumulative area (cumulative opening area of pores having diameters equal to or less than a particular equivalent circle diameter) of pores opening on the cell wall surface are plotted against an equivalent circle diameter (diameter of a circle having the same area as the opening area of a pore), the median opening diameter of opening pores is an equivalent circle diameter of a pore at which the cumulative area reaches 50% of the total pore area. The opening areas of pores and the equivalent circle diameters are determined by analyzing an electron photomicrograph of a cell wall surface by an image analyzer (for example, Image-Pro Plus ver. 3.0 available from Media Cybernetics).

When the median opening diameter is less than 10 low pressure loss cannot be kept while capturing PM. On the other hand, when the median opening diameter is 40 μm or more, the PM-capturing ratio lowers at an early stage of use after regeneration. The median opening diameter is preferably 15-35 μm.

(iv) Density of Pores

The density of pores opening on the cell wall surface, whose equivalent circle diameters are 10 μm or more and less than 40 μm, is the number of pores having equivalent circle diameters of 10 μm or more and less than 40 μm, per a unit area of the cell wall surface.

When the density of pores having equivalent circle diameters of 10 μm or more and less than 40 μm is less than 350/mm², the PM-capturing ratio lowers at an early stage of use after regeneration. The density of pores is preferably 400/mm² or more.

(v) Circularity

When pores having equivalent circle diameters of 10 μm or more and less than 40 μm have average circularity exceeding 2, it is difficult to keep low pressure loss while capturing PM, resulting in a low PM-capturing ratio at an early stage of use after regeneration. The average circularity is preferably 1-1.5. The circularity is expressed by a ratio $A_1/A_0$, wherein $A_0$ represents the opening area of a pore, and $A_1$ represents the area of a circle having the same circumferential length as the peripheral length L of the pore. The circularity is 1 or more.

(vi) Darcy's Coefficient of Permeability

The cell walls of the ceramic honeycomb structure preferably have a Darcy's coefficient of permeability in a range of $0.1 \times 10^{-12}$ m² to $2 \times 10^{-12}$ m². With the above Darcy's coefficient of permeability, initial pressure loss is kept low when starting use after regeneration, improving the PM-capturing ratio at an early stage of use after regeneration, and lowering the pressure loss when PM is captured. When the Darcy's coefficient of permeability is less than $0.1 \times 10^{-12}$ m², it is difficult to keep the initial pressure loss low when starting use after regeneration. The Darcy's coefficient of permeability exceeding $2 \times 10^{-12}$ m² is likely to provide poor PM-capturing performance. The Darcy's coefficient of permeability is preferably $0.2 \times 10^{-12}$ M² to $1.5 \times 10^{-12}$ m².

(vii) Pore Diameter and Pore Size Distribution

With pore diameters measured by mercury porosimetry, the cell walls of the ceramic honeycomb structure preferably have a median pore diameter of 5 μm or more and less than 20 the volume of pores having diameters of less than 2 μm being 10% or less of the total pore volume, and the volume of pores having diameters of 40 μm or more being 10% or less of the total pore volume; and a pore size distribution deviation σ of 0.5 or less. With such pore structure, initial pressure loss is kept low when starting use after regeneration, resulting in an improved PM-capturing ratio at an early stage of use after regeneration, and reduced pressure loss when PM is captured.

Figure 4:
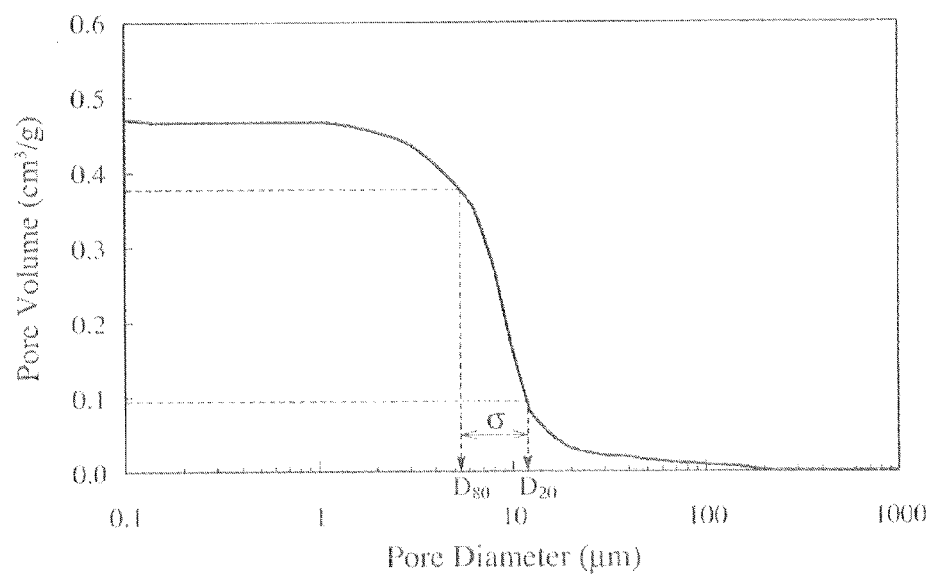
FIG. 4 is a graph showing the relation between a pore diameter and a pore volume in the ceramic honeycomb structure of Example 11.

The pore size distribution deviation σ is, as shown in FIG. 4, expressed by $\log(D_{20})-\log(D_{80})$, wherein $D_{20}$ represents a pore diameter (μm) at a pore volume corresponding to 20% of the total pore volume, and $D_{80}$ similarly represents a pore diameter (m) at a pore volume corresponding to 80% of the total pore volume, on a curve showing the relation between a pore diameter measured by mercury porosimetry and a cumulative pore volume obtained by accumulating a pore volume from the maximum pore diameter to a particular pore diameter, and $D_{80}<D_{20}$.

When the median pore diameter is less than 5 μm, it is difficult to keep the initial pressure loss low when starting use after regeneration. The median pore diameter of 20 μm or more results in a decreased volume of pores having diameters of 5 μm or more and less than 20 μm for effectively capturing PM, likely resulting in poor PM-capturing performance. The median pore diameter is preferably 7-18 μm.

Pores having diameters of less than 2 μm are effective to achieve communications between larger pores, improving the initial pressure loss characteristics. Though pores having diameters of less than 2 μm in a volume exceeding 10% secure the communications of pores, the percentage of pores having diameters exceeding 2 μm is relatively small, making it difficult to keep the initial pressure loss low. When pores having diameters of less than 2 μm are insufficient, enough communications of pores are not achieved, resulting in large initial pressure loss. Accordingly, the volume of pores having diameters of less than 2 μm is preferably 1-8%.

When the volume of pores having diameters of 40 μm or more exceeds 10% of the total pore volume, the volume of pores having diameters of 5 μm or more and less than 20 μm effective for capturing PM becomes smaller, resulting in poor PM-capturing performance. The volume of pores having diameters of 40 μm or more is preferably 8% or less.

When the volume of pores having diameters of less than 2 μm is 10% or less, when the volume of pores having diameters of 40 μm or more is 10% or less, and when the pore size distribution deviation σ is 0.5 or less, there are a high percentage of pores having a median diameter of 5 μm or more and less than 20 μm, resulting in a sharp pore size distribution. Low initial pressure loss is achieved by cell walls having such structure. However, when the pore size distribution deviation σ exceeds 0.5, there are a high percentage of pores adversely affecting the initial pressure loss characteristics, making it difficult to keep low initial pressure loss. The pore size distribution deviation σ is preferably 0.45 or less, more preferably 0.4 or less.

(viii) Honeycomb Structure

The ceramic honeycomb structure preferably has an average cell wall thickness in a range of 9.0-12 mil, and an average cell density in a range of 150-300 cpsi. With such honeycomb structure, low initial pressure loss is achieved when starting use after regeneration, improving the PM-capturing ratio at an early stage of use after regeneration, and reducing the pressure loss when PM is captured. The average cell wall thickness of less than 9.0 mil (0.229 mm) provides cell walls with low strength, and the average cell wall thickness exceeding 12 mil (0.305 mm) makes it difficult to keep low pressure loss. The average cell density of less than 150 cpsi (23.3 cells/cm²) provides cell walls with low strength, and the average cell density exceeding 300 cpsi (46.5 cells/cm²) makes it difficult to keep low pressure loss.

(2) Thermal Expansion Coefficient

The ceramic honeycomb structure preferably has a thermal expansion coefficient of $13\times10^{-7}/°$ C. or less between 20° C. and 800° C. With such thermal expansion coefficient, it keeps heat shock resistance with practically enough strength when used for a ceramic honeycomb filter for removing fine particles from exhaust gases discharged from diesel engines. The thermal expansion coefficient is preferably $3\times10^{-7}/°$ C. to $11\times10^{-7}/°$ C.

(3) Materials

For use in filters for cleaning exhaust gases discharged from diesel engines, cell walls constituting the ceramic honeycomb structure are preferably made of heat-resistant ceramics comprising as main crystals alumina, mullite, cordierite, silicon carbide, silicon nitride, zirconia, aluminum titanate, lithium aluminum silicate, etc. Among them, ceramics having excellent heat shock resistance with low thermal expansion such as cordierite and aluminum titanate are preferable. When the main crystal phase is cordierite, other crystal phases such as spinel, mullite, sapphirine, etc. may be contained, and glass components may also be contained.

(4) Ceramic Honeycomb Filter

With the exhaust gas inlet and outlet sides of flow paths plugged alternately in a checkerboard pattern, the ceramic honeycomb structure of the present invention can be used for a ceramic honeycomb filter capable of keeping low initial pressure loss when starting use after regeneration, thereby having an improved PM-capturing ratio at an early stage of use after regeneration, and reduced pressure loss when PM is captured. As long as the exhaust gas inlet and outlet sides are plugged alternately in a checkerboard pattern, plugs need not be formed in end surface portions of the flow paths, but may be formed in portions inside the inlet or outlet end surfaces of the honeycomb structure.

[2] Method for Producing Ceramic Honeycomb Structure

The method of the present invention for producing a honeycomb-shaped ceramic structure by extrusion-molding a moldable material comprising a cordierite-forming material and a pore-forming material is characterized in that the cordierite-forming material contains 15-25% by mass of silica;

the silica has an average particle size of 20-30 μm, particles having particle sizes of 10 μm or less being 5% or less by mass, and particles having particle sizes of 100 μm or more being 5% or less by mass, a particle size distribution deviation SD of 0.5 or less, and sphericity of 0.5 or more;

the amount of the pore-forming material is 5-40% by mass based on the cordierite-forming material; and the pore-forming material has an average particle size of 15-50 particles having particle sizes of 5 μm or less being 10% or less by mass, particles having particle sizes of 80 μm or more being 5% or less by mass, a particle size distribution deviation SD of 0.5 or less, and sphericity of 0.5 or more.

Figure 5:
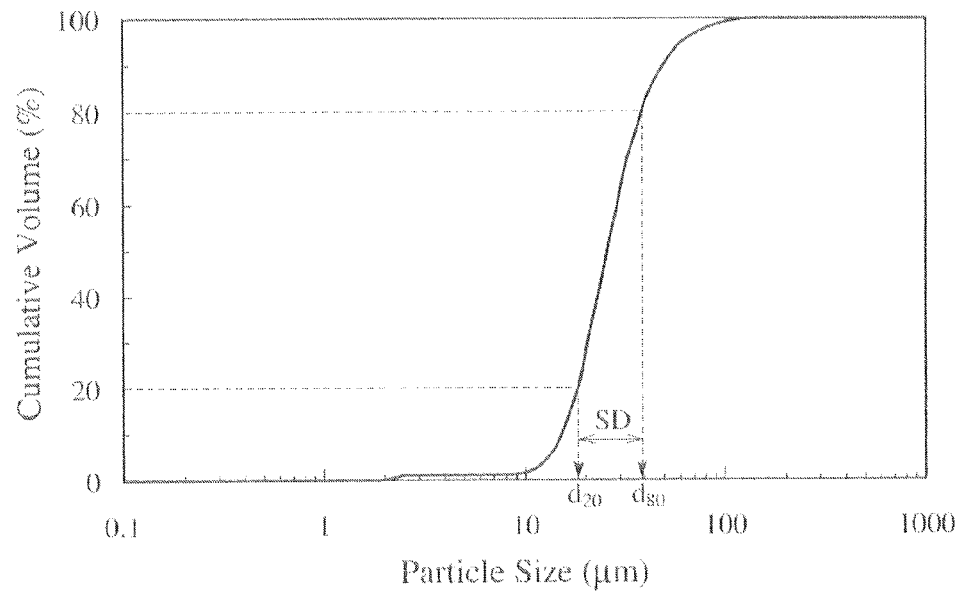
FIG. 5 is a graph showing the particle size distribution of silica E used in Examples within the present invention.

The particle size distribution deviations SD of silica particles and pore-forming material particles are expressed by $SD=\log(d_{80})-\log(d_{20})$, wherein as shown in FIG. 5, $d_{20}$ represents a particle size (m) at a cumulative volume corresponding to 20% of the total volume, and $d_{80}$ similarly represents a particle size (μm) at a cumulative volume corresponding to 80% of the total volume, on a curve showing the relation between a particle size and a cumulative volume of particles having a particular particle size or less, and $d_{20}<d_{80}$. The particle sizes can be measured, for example, by a particle size distribution meter (Microtrack MT3000 available from Nikkiso Co., Ltd.). The average particle sizes of silica particles and pore-forming material particles are expressed by median diameters ($d_{50}$), particle sizes at a cumulative volume corresponding to 50% of the total volume, on the above curve showing the relation between a particle size and a cumulative volume. Unless otherwise mentioned herein, the particle size distribution deviation SD and average particle size of other particles are similarly defined.

The method of the present invention can provide a ceramic honeycomb structure having a large number of flow paths partitioned by porous cell walls, the cell walls having porosity of 40-60%; pores opening on the cell wall surface having an opening area ratio (the total opening area of pores opening on the cell wall surface per a unit area) of 15% or more; when the opening diameter of each pore opening on the cell wall surface is expressed by an equivalent circle diameter (a diameter of a circle having the same area as the opening area of each pore), the median opening diameter of the opening pores being 10 μm or more and less than 40 μm; the density of pores having equivalent circle diameters of 10 μm or more and less than 40 μm being 350/mm² or more; and the average circularity of pores having equivalent circle diameters of 10 μm or more and less than 40 μm being 1-2.

The cordierite-forming material is obtained from starting material powders containing a silica source, an alumina source and a magnesia source, such that its main crystal is cordierite comprising as main components 42-56% by mass of $SiO_2$, 30-45% by mass of $Al_2O_3$ and 12-16% by mass of MgO. Pores formed in the cordierite-based ceramics include pores generated by sintering silica and talc in the cordierite-forming material, and pores generated by burning off the pore-forming material.

Because silica and the pore-forming material have main contribution to the formation of pores, the adjustment of their average particle sizes and particle size distributions can control pores generated by sintering the cordierite ceramics. Accordingly, the use of silica and the pore-forming material with their amounts, average particle sizes and particle size distributions controlled in the above ranges can provide a ceramic honeycomb structure having cell walls having the preferred pore structure, as well as an improved PM-capturing ratio at an early stage of use after regeneration, and reduced pressure loss when PM is captured.

(1) Silica Particles

It is known that silica exists more stably up to high temperatures than other starting materials, and is melted and diffused at 1300° C. or higher to form pores. Accordingly, when 15-25% by mass of silica is contained, pores in a desired amount are obtained. When the amount of silica exceeds 25% by mass, the amounts of kaolin and talc, other silica sources, should be reduced to keep cordierite as a main crystal. As a result, the thermal-expansion-reducing effect of kaolin, which is obtained by the orientation of kaolin during extrusion molding, is reduced, resulting in lower heat shock resistance. On the other hand, less than 15% of silica provides a smaller amount of pores opening on the cell wall surface, making it unlikely to achieve low pressure loss when PM is captured. The preferred amount of silica is 17-23%.

When silica has an average particle size of less than 20 μm, there are a large percentage of fine pores having adverse effects on the maintenance of low pressure loss when PM is captured, among pores opening on the cell wall surface. On the other hand, when the average particle size of silica exceeds 30 μm, there are many large pores adversely affecting a PM-capturing ratio at an early stage of use after regeneration. The preferred average particle size of silica is 22-28 μm.

When more than 5% by mass of silica particles have particle sizes of 10 μm or less, pores opening on the cell wall surface contain fine pores adversely affecting the maintenance of low pressure loss while capturing PM at high percentage. 3% or less by mass of silica particles preferably have particle sizes of 10 μm or less.

When more than 5% by mass of silica particles have particle sizes of 100 μm or more, there are many large pores deteriorating a PM-capturing ratio at an early stage of use after regeneration, likely resulting in poor PM-capturing performance at an early stage of use after regeneration. The percentage of silica particles having particle sizes of 100 μm or more is preferably 3% or less by mass.

When silica particles have an average particle size of 20-30 μm, when silica particles having particle sizes of 10 μm or less are 5% or less by mass, and when silica particles having particle sizes of 100 μm or more are 5% or less by mass, the percentage of pores contributing to the maintenance of low pressure loss while capturing PM without deteriorating the PM-capturing ratio at an early stage of use after regeneration is made higher among those on the cell wall surface, by setting the particle size distribution deviation SD of silica particles at 0.5 or less.

When the particle size distribution deviation SD exceeds 0.5, a particle size distribution becomes broader, resulting in a broader pore size distribution. As a result, the percentage of pores adversely affecting the PM-capturing ratio and the pressure loss characteristics becomes higher, resulting in a lower PM-capturing ratio at an early stage of use after regeneration, and failing to maintain low pressure loss while capturing PM. The particle size distribution deviation SD is preferably 0.45 or less, more preferably 0.4 or less. Silica particles having the above desired particle size distribution can be obtained by the classification of silica particles by a classification apparatus, the mixing of pluralities of silica particles classified to several particle size ranges, or the optimization of pulverization conditions.

Silica particles having sphericity of 0.5 or more are used. When the sphericity of silica particles is less than 0.5, pores opening on the cell wall surface have large circularity, and there are many large pores deteriorating the capturing of PM at an early stage of use after regeneration, and an increased number of fine pores adversely affecting the maintenance of low pressure loss while capturing PM. The sphericity of silica particles is preferably 0.6 or more, more preferably 0.7 or more. The sphericity of a silica particle is a value obtained by dividing a projected area of a silica particle by the area of a circle, whose diameter is the longest straight line passing a center of gravity of the silica particle and connecting two points on the periphery of the silica particle, which is determined from an electron photomicrograph by an image analyzer.

Though silica particles may be crystalline or amorphous, they are preferably amorphous to control the particle size distribution. Amorphous silica can be obtained by melting high-purity, natural silica stone at high temperatures and pulverizing the resultant ingot. Though silica particles may contain $Na_2O$, $K_2O$ and $CaO$ as impurities, the total amount of the above impurities is preferably 0.1% or less to prevent a large thermal expansion coefficient.

Figure 6:
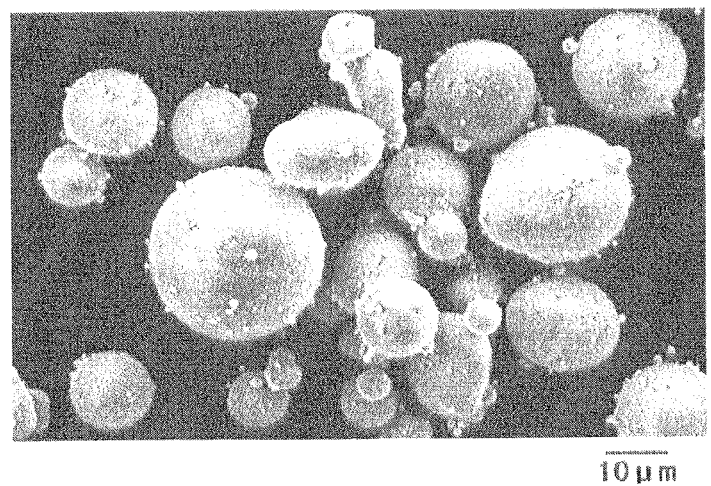
FIG. 6 is an electron photomicrograph showing one example of silica particles.

High-sphericity silica particles can be obtained by spraying finely pulverized, high-purity, natural silica stone into a high-temperature flame. Spraying into a high-temperature flame causes the melting and spheroidization of silica particles simultaneously, providing spherical, amorphous silica as shown in FIG. 6. The spherical silica particles are preferably adjusted with respect to particle size by classification, etc.

(2) Pore-Forming Materials 5-40% by mass of the pore-forming material added to the cordierite-forming material is burned off to form pores before cordierite is synthesized in the cordierite ceramic sintering process. When the amount of the pore-forming material added is less than 5% by mass, a small amount of pores are formed by the pore-forming material, failing to keep low pressure loss while capturing PM. When the amount of the pore-forming material added exceeds 40% by mass, there are a high percentage of pores deteriorating the PM-capturing ratio at an early stage of use after regeneration. The amount of the pore-forming material added is preferably 5-15% by mass, more preferably 7-13% by mass.

The pore-forming material particles have an average particle size of 15-50 µm. When the average particle size is less than 15 µm, there are a small amount of pores contributing to the maintenance of low pressure loss, resulting in increased pressure loss when PM is captured. When the average particle size of the pore-forming material particles exceeds 50 µm, large pores are formed, resulting in an increased percentage of pores deteriorating the PM-capturing ratio at an early stage of use after regeneration. The pore-forming material particles preferably have an average particle size of 17-45 µm.

The pore-forming material has a particle size distribution deviation SD of 0.5 or less. The pore-forming material having a particle size distribution deviation SD of 0.5 or less provides a sharp pore size distribution, resulting in an increased percentage of pores contributing to the maintenance of low pressure loss while capturing PM, and capable of capturing PM at an early stage of use after regeneration. As a result, porous cell walls having the pore structure of the present invention are formed, providing a ceramic honeycomb structure keeping low pressure loss while capturing PM, with an improved PM-capturing ratio at an early stage of use after regeneration.

The pore-forming material having a particle size distribution deviation SD exceeding 0.5 provides a broad particle size distribution, resulting in a broad pore size distribution. As a result, an increased percentage of pores adversely affecting the PM-capturing ratio and the pressure loss characteristics are formed, resulting in a low PM-capturing ratio at an early stage of use after regeneration, and failing to keep low pressure loss while capturing PM. The particle size distribution deviation SD of the pore-forming material is preferably 0.4 or less, more preferably 0.35 or less.

Pore-forming material particles having sphericity of 0.5 or more are used. When the sphericity of the pore-forming material particles is less than 0.5, pores opening on the cell wall surface have large circularity, resulting in an increased percentage of large pores deteriorating the capturing of PM at an early stage of use after regeneration, and an increased percentage of fine pores adversely affecting the maintenance of low pressure loss while capturing PM. The sphericity of the pore-forming material particles is preferably 0.7 or more, more preferably 0.8 or more. The sphericity of the pore-forming material particles can be determined by the same method as in the silica particles.

As long as the average particle size and particle size distribution deviation SD of the pore-forming material are within the above ranges, the pore-forming material is not restricted with respect to its material, but may be graphite, flour, starch, unfoamed resins, foamed resins, foamed, hollow resins, ceramic-coated resins, ceramic-coated, hollow resins, porous polymers, etc.

In the production of the ceramic honeycomb structure of the present invention, the pore-forming material particles are preferably porous polymers, having 30% or more and less than 50% of voids, with 80% or more of the voids containing water. When the pore-forming material particles are porous polymer particles having 30% or more and less than 50% of voids, cracking is unlikely to occur by sintering because of small heat of combustion during sintering, and the pore-forming material particles are resistant to breakage during extrusion molding, stably providing desired pores.

Porous polymers used for the pore-forming material particles are preferably polymethyl methacrylate, polybutyl methacrylate, polyacrylates, polystyrenes, etc.

When voids are less than 30% of the pore-forming material particles, the pore-forming material particles generate a large heat of combustion during sintering, making cracking likely in the resultant ceramic honeycomb structure. On the other hand, when they are 50% or more, the pore-forming material particles are easily broken while mixing and blending the starting materials, failing to obtain the desired pore size distribution stably.

When a starting material containing the pore-forming material is used, high pressure is usually needed for its extrusion molding because of high friction resistance between the pore-forming material particles, likely resulting in a deformed extrudate. In some cases, a molding die may be deformed because of high pressure. However, the use of a porous polymer having voids, 80% or more of which contain water, as a pore-forming material reduces friction resistance between the pore-forming material particles, enabling extrusion molding without needing high extrusion pressure. Porous polymers having water-containing voids can be produced by vacuum impregnation apparatuses.

(3) Talc

In the production of the ceramic honeycomb structure of the present invention, the cordierite-forming material preferably contains 40-43% by mass of talc, which has an average particle size of 1-10 µm, $d_{90}$ of 30 µm or less, and a particle size distribution deviation SD of 0.7 or less. The term "$d_{90}$" means a particle size at a cumulative volume corresponding to 90% of the total volume, on a curve showing the relation between a particle size and a cumulative volume of particles having a particular particle size or less.

The cell walls contain pores formed by the sintering of silica and talc in the cordierite-forming material, and pores generated by burning off the pore-forming material. Pores formed by talc particles having a smaller average particle size of 1-10 µm than those of silica and the pore-forming material achieve communications between pores formed by silica and the pore-forming material, improving the communications of pores in the cell walls. As a result, low pressure loss is kept while capturing PM. Particularly, the use of the above porous polymer as the pore-forming material forms desired pores stably in the cell walls, providing low pressure loss stably while capturing PM. However, when the average particle size of talc is less than 1 µm, the pores are not well communicating, failing to achieve low initial pressure loss while capturing PM. On the other hand, when the average particle size of talc exceeds 10 µm, many large pores deteriorating the PM-capturing ratio at an early stage of use after regeneration are formed. The preferred average particle size of the talc particles is 2-8 µm.

When the particle size $d_{90}$ of talc at a cumulative volume corresponding to 90% of the total volume exceeds 30 μm on a curve showing the relation between a particle size and a cumulative volume of particles having a particular particle size or less, there are many large pores deteriorating the PM-capturing ratio at an early stage of use after regeneration. The $d_{90}$ is preferably 25 μm or less.

When the talc particles have an average particle size of 1-10 μm, and $d_{90}$ (a particle size at a cumulative volume corresponding to 90% of the total volume on a curve showing the relation between a particle size and a cumulative volume of particles having a particular particle size or less) of 30 μm or less, a sharp pore size distribution can be obtained by meeting that talc has a particle size distribution deviation SD of 0.7 or less, thereby increasing the percentage of pores capable of capturing PM while keeping low initial pressure loss at an early stage of use after regeneration.

The particle size distribution deviation SD exceeding 0.7 provides a broad particle size distribution, and thus a broad pore size distribution. As a result, there are a high percentage of pores adversely affecting the PM-capturing ratio and the pressure loss characteristics, resulting in a low PM-capturing ratio at an early stage of use after regeneration, and failing to keep low pressure loss while capturing PM. The particle size distribution deviation SD is preferably 0.65 or less, more preferably 0.6 or less. Talc particles having the above desired particle size distribution can be obtained by classification by a classification apparatus, mixing of pluralities of talc particles classified to several particle size ranges, or the optimization of pulverization conditions.

To reduce the thermal expansion coefficient of a ceramic honeycomb structure having a cordierite-based crystal phase, talc particles are preferably platy, in a platelike shape. The morphology index, which is a measure of the platy character of talc particles, is preferably 0.77 or more, more preferably 0.8 or more, most preferably 0.83 or more. The above morphology index is, as described in U.S. Pat. No. 5,141,686, determined by the formula of morphology index=$Ix/(Ix+2Iy)$, wherein Ix and Iy respectively represent the diffraction intensities of (004) and (020) planes of talc, which are obtained by the X-ray diffraction measurement of planar talc particles in an oriented state. The larger the morphology index, the more platy the talc particles.

Talc may contain as impurities $Fe_2O_3$, CaO, $Na_2O$, $K_2O$, etc. The amount of $Fe_2O_3$ is preferably 0.5-2.5% by mass in the magnesia source to obtain the desired particle size distribution. The total amount of $Na_2O$, $K_2O$ and CaO is preferably 0.50% or less by mass to have a low thermal expansion coefficient.

(4) Kaolin

Kaolin powder may be added as a silica source, in addition to the above silica powder. The amount of the kaolin powder is preferably 1-15% by mass. When the amount of the kaolin powder exceeds 15% by mass, it may be difficult to adjust the percentage of pores having diameters of less than 2 μm to 10% or less in the ceramic honeycomb structure. When the amount of the kaolin powder is less than 1% by mass, the ceramic honeycomb structure has a large thermal expansion coefficient. The amount of the kaolin powder is more preferably 4-8% by mass.

When kaolin particles are oriented such that their c-axes are perpendicular to the longitudinal direction of the extrusion-molded honeycomb structure, the c-axes of cordierite crystals are in parallel to the longitudinal direction of the honeycomb structure, providing the honeycomb structure with a small thermal expansion coefficient. The shape of kaolin particles has large influence on the orientation of kaolin particles in the molded article. To orient kaolin particles as described above, the cleavage index of kaolin particles, which is an index indicating the shape of kaolin particles quantitatively, is preferably 0.80 or more, more preferably 0.85 or more. The larger the cleavage index, the more the kaolin particles are oriented.

The cleavage index of kaolin particles can be determined by the formula of cleavage index=$I_{(002)}/(I_{(200)}+I_{(020)}+I_{(002)})$, wherein $I_{(200)}$, $I_{(020)}$ and $I_{(002)}$ respectively represent the X-ray diffraction peak intensities of (200), (020) and (002) planes of kaolin particles, which are filled in a predetermined amount in a container by pressing.

(5) Alumina Source

The alumina source materials are preferably aluminum oxide and/or aluminum hydroxide because of little impurities. The total amount of $Na_2O$, $K_2O$ and CaO, impurities in aluminum oxide and aluminum hydroxide, is preferably 0.5% or less by mass, more preferably 0.3% or less by mass, most preferably 0.1% or less by mass. When aluminum hydroxide is used, its amount in the cordierite-forming material is preferably 6-42% by mass. When aluminum oxide is used, its amount in the cordierite-forming material is preferably 35% or less by mass.

(6) Production Method

The cordierite-forming material powder and the pore-forming material prepared as described above are dry-mixed with a binder, and if necessary, additives such as a dispersant, a surfactant, etc., and then blended with water to produce a moldable material. When the additives are in a liquid form, they may be added at the time of blending. This moldable material is extruded from a known die by a known extrusion-molding method to form a honeycomb molding. After drying, the end surfaces and periphery, etc. of the molding are machined, if necessary, and then sintered to obtain a ceramic honeycomb structure.

Sintering is conducted by heating the molding at a controlled speed in a continuous or batch furnace, keeping it at 1350-1450° C. for 1-50 hours to form cordierite sufficiently as main crystals, and then cooling it to room temperature. Particularly in the case of a large ceramic honeycomb structure having an outer diameter of 150 mm or more and a length of 150 mm or more, the temperature-elevating speed is preferably 0.2-10° C./hr in a binder-decomposing temperature range, for example, between 150° C. and 350° C., and 5-20° C./hr in a cordierite-forming temperature range, for example, between 1150° C. and 1400° C., thereby preventing cracking in the ceramic honeycomb structure in the sintering process. The cooling is preferably conducted at a speed of 20-40° C./h in a temperature range of 1400° C. to 1300° C.

The resultant honeycomb structure is provided with plugs by a known method to provide a ceramic honeycomb filter with ends of desired flow paths plugged. Plugs may be formed before sintering.

In the production method of the present invention, it is important to adjust the particle size distributions of silica, talc and the pore-forming material as described above. Accordingly, in the present invention, after adding the pore-forming material and a binder, the cordierite-forming material comprising silica particles, talc particles, kaolin particles, alumina particles, etc. are preferably mixed by a means using no pulverization medium, such as a Henschel mixer, etc., and after water is added, blended by a means applying no excessive shearing, such as a kneader, etc., to prepare an extrusion-moldable material.

Mixing by a means using no pulverization medium prevents silica particles, particularly amorphous silica particles, from being pulverized in the mixing process, so that silica particles having the desired particle size distribution and particle shapes can remain in the extrusion-molded article. Thus, a ceramic honeycomb structure having an improved PM-capturing ratio at an early stage of capturing after regeneration while keeping low pressure loss can be obtained. Particularly when spherical silica is used, large effects are obtained by using the above mixing method. When a mixing means using a pulverization medium, such as a ball mill, etc. is used, silica particles, particularly spherical silica particles, are pulverized in the mixing process, their shapes and particle sizes are undesirably changed.

Examples of the present invention will be explained in detail below.

Silica powder, kaolin powder, talc powder, alumina powder and aluminum hydroxide powder having particle shapes (particle sizes, particle size distributions, etc.) shown in Tables 1-4 were mixed in the amounts shown in Table 6, to obtain cordierite-forming material powders having a chemical composition comprising 50% by mass of $SiO_2$, 35% by mass of $Al_2O_3$ and 13% by mass of MgO. Each of these cordierite-forming material powders was mixed with a pore-forming material having the particle shape shown in Table 5 in the amount shown in Table 6, and blended with methylcellulose and water to prepare a moldable ceramic material (moldable cordierite-forming material). The pore-forming materials A-M were used with their voids impregnated with water by a vacuum impregnation apparatus. Table 5 shows the volumes of water occupying the voids of the porous polymers as water contents.

Figure 7:
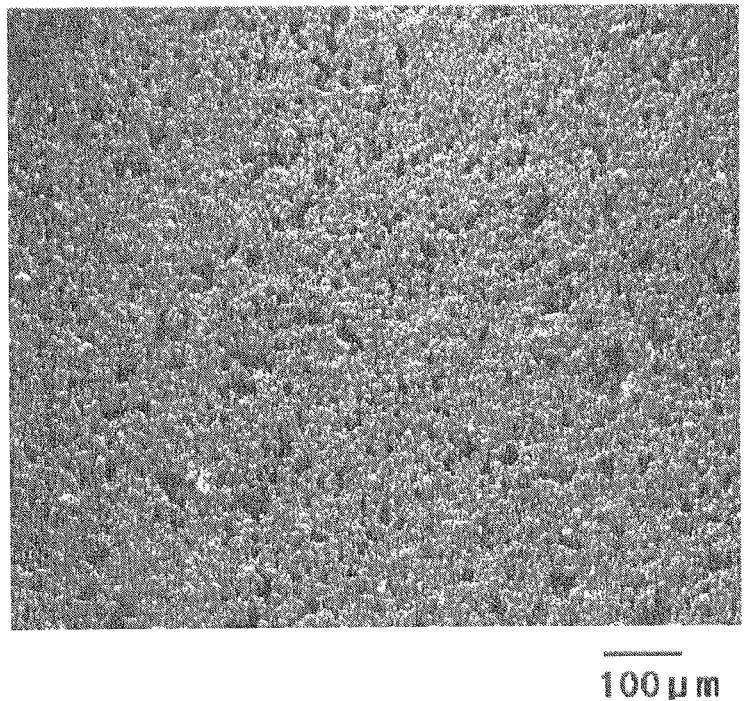
FIG. 7 is an electron photomicrograph showing a cell wall surface of the ceramic honeycomb structure of Example 11.
Figure 8:
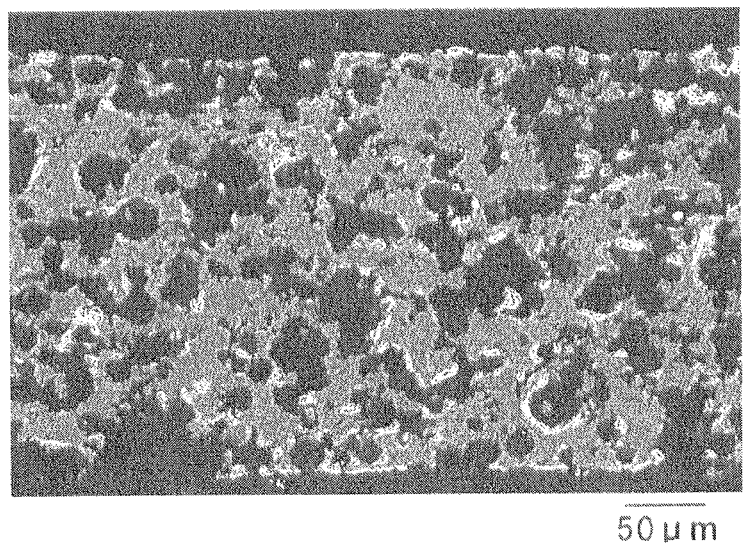
FIG. 8 is an electron photomicrograph showing the cell wall cross section of the ceramic honeycomb structure of Example 11.

The resultant moldable material was extruded to form a honeycomb-structure molding, and dried. With its peripheral portion removed, it was sintered for 200 hours in a furnace, by a schedule comprising temperature elevation from 150° C. to 350° C. and 1150° C. to 1400° C. at speeds of 2° C./hr and 10° C./hr, respectively, keeping at the highest temperature of 1410° C. for 24 hours, and cooling from 1400° C. to 1300° C. at a speed of 30° C./hr. With a periphery coated with a skin material comprising amorphous silica and colloidal silica, the sintered ceramic honeycomb body was dried to obtain the ceramic honeycomb structures of Examples 1-26 and Comparative Examples 1-9 each having an outer diameter of 266.7 mm and a length of 304.8 mm, and the cell pitch and cell wall thickness shown in Table 7. FIGS. 7 and 8 are electron photomicrographs showing the cell wall surface and cross section of the ceramic honeycomb structure of Example 11.

The particle size distributions of silica powders and talc powders were measured by a particle size distribution meter (Microtrack MT3000 available from Nikkiso Co., Ltd.), to determine an average particle size (median diameter $d_{50}$), the percentages of particles having particle sizes of 10 μm or less and 100 μm or more, respectively, and a particle size distribution deviation. The sphericity of silica particles was determined by calculating the formula of $A_1/A_2$, wherein $A_1$ is a projected area determined from an electron microscopic image of each particle by an image analyzer, and $A_2$ is an area of a circle whose diameter is the longest straight line passing the center of gravity and connecting two points on the periphery diameter, and averaging the values of $A_1/A_2$ determined on 20 particles.

Flow path ends of each ceramic honeycomb structure were alternately plugged with a slurry of a cordierite-forming material, and the plugging slurry was dried and sintered to produce each of the cordierite-type ceramic honeycomb filters of Examples and Comparative Examples. The sintered plugs were as long as 7-10 mm. In each Example and Comparative Example, the same two ceramic honeycomb filters were produced.

With respect to one of the ceramic honeycomb filters in each of Examples 1-26 and Comparative Examples 1-9, the number of pores opening on the cell wall surface, and the Darcy's coefficient of permeability were measured. The results are shown in Table 7.

The opening area ratio of pores opening on the cell wall surface was determined by analyzing the electron photomicrograph of cell walls cut out of the honeycomb filter by an image analyzer (Image-Pro Plus ver. 3.0 available from Media Cybernetics), and calculating the total opening area of pores per the area of the measured field. Also, the equivalent circle diameters (diameter of a circle having the same area as the opening area of each pore) of pores opening on the cell wall surface were calculated, and plotted to a cumulative area of pores opening on the cell wall surface (cumulative opening area of pores having a particular equivalent circle diameter or less), to obtain a graph of FIG. 3. In FIG. 3, the equivalent circle diameter of pores having a cumulative area corresponding to 50% of the total pore area was regarded as a median opening diameter. The density of pores opening on the cell wall surface with equivalent circle diameters of 10 μm or more and less than 40 μm was defined by the number of pores having equivalent circle diameters of 10 μm or more and less than 40 μm per an unit area of the cell wall surface.

The porosity, the median pore diameter, the volume of pores having 5 μm or more and less than 20 μm, the volume of pores having 20 μm or more, and the pore size distribution deviation were measured by mercury porosimetry. A test piece (10 mm×10 mm×10 mm) cut out of each ceramic honeycomb filter was set in a measurement cell of Autopore III available from Micromeritics, and the cell was evacuated. Thereafter, mercury was introduced into the cell under pressure. The relation between a pore diameter and a cumulative pore volume was determined from the relation between pressure and the volume of mercury intruded into pores in the test piece. The mercury-intruding pressure was 0.5 psi ($0.35×10^{-3}$ kg/mm²), and constants used for calculating the pore diameter from the pressure were a contact angle of 130°, and a surface tension of 484 dyne/cm. The porosity was calculated from the measured total pore volume, using 2.52 g/cm³ as the true density of cordierite.

The thermal expansion coefficient (CTE) between 20° C. and 800° C. was measured on another test piece cut out of the honeycomb filter.

The Darcy's coefficient of permeability was determined as the maximum permeability measured by Perm Automated Porometer (registered trademark) 6.0 available from Porous Materials, Inc., with the flow rate of air increasing from 30 cc/sec to 400 cc/sec.

With respect to the remaining one of the ceramic honeycomb filters of Examples 1-26 and Comparative Examples 1-9, the initial pressure loss, the pressure loss when 2 g/liter of soot was captured, and the soot-capturing efficiency were measured. The results are shown in Table 7.

The initial pressure loss was measured on a ceramic honeycomb filter fixed to a pressure loss test stand, to which air was supplied in a flow rate of 10 Nm³/min, and expressed by pressure difference between the inlet side and the outlet side (pressure loss). The initial pressure loss was evaluated as "Good" when the pressure loss was more than 0.7 kPa and 1.0 kPa or less, "Excellent" when the pressure loss was 0.7 kPa or less, and "Poor" when the pressure loss was more than 1.0 kPa.

The pressure loss when 2 g/liter of soot was captured was measured on a ceramic honeycomb filter fixed to a pressure loss test stand, to which carbon powder having particle sizes of 0.042 μm was supplied at a speed of 3 g/h together with 10 Nm³/min of air, and expressed by pressure difference between the inlet side and the outlet side (pressure loss) when 2 g of soot was captured per 1 liter of the filter volume. The soot-capturing pressure loss was evaluated as "Good" when the pressure loss was more than 1.2 kPa and 1.5 kPa or less, "Excellent" when the pressure loss was 1.2 kPa or less, and "Poor" when the pressure loss was more than 1.5 kPa.

With carbon powder having particle sizes of 0.042 μM supplied at a speed of 3 g/h together with 10 Nm³/min of air to a ceramic honeycomb filter fixed to a pressure loss test stand as described above, the capturing efficiency was determined by counting the number of carbon powder particles flowing into and from the honeycomb filter every 1 minute by a scanning mobility particle sizer (SMPS) (Model 3936 of TIS), and calculating the ratio of $(N_{in} - N_{out})/N_{in}$, wherein $N_{in}$ and $N_{out}$ respectively represent the number of carbon powder particles flowing into and from the honeycomb filter between 3 minutes and 4 minutes from the start of supply. The capturing efficiency was evaluated as "Good" when the ratio was 95% or more and less than 98%, "Excellent" when the ratio was 98% or more, and "Poor" when the ratio was less than 95%.

TABLE 1

| Starting Materials | Average Particle Size (μm) | Percentage of Pores (%) 10 μm or less | Percentage of Pores (%) 100 μm or more | Particle Size Distribution Deviation SD [log (μm)] |
|---|---|---|---|---|
| Silica A | 30 | 1.0 | 4.2 | 0.34 |
| Silica B | 20 | 4.2 | 0.7 | 0.34 |
| Silica C | 25 | 2.1 | 1.5 | 0.50 |
| Silica D | 25 | 1.8 | 1.0 | 0.33 |
| Silica E | 25 | 1.8 | 1.0 | 0.33 |
| Silica F | 40 | 0.9 | 12.0 | 0.43 |
| Silica G | 15 | 11.0 | 1.5 | 0.41 |
| Silica H | 28 | 13.0 | 10.0 | 0.59 |
| Silica I | 17 | 30.0 | 11.0 | 0.70 |

| Starting Materials | Sphericity | Impurities (%) CaO | Impurities (%) Na₂O | Impurities (%) K₂O |
|---|---|---|---|---|
| Silica A | 0.85 | 0.001 | 0.0024 | 0.0026 |
| Silica B | 0.85 | 0.001 | 0.0024 | 0.0026 |
| Silica C | 0.84 | 0.001 | 0.0024 | 0.0026 |
| Silica D | 0.50 | 0.001 | 0.0019 | 0.0021 |
| Silica E | 0.84 | 0.001 | 0.0019 | 0.0021 |
| Silica F | 0.83 | 0.001 | 0.0024 | 0.0026 |
| Silica G | 0.83 | 0.001 | 0.0024 | 0.0026 |
| Silica H | 0.82 | 0.001 | 0.0024 | 0.0026 |
| Silica I | 0.20 | 0.001 | 0.0024 | 0.0026 |

TABLE 2

| Starting Materials | Average Particle Size (μm) | Cleavage Index | Impurities (%) CaO | Impurities (%) Na₂O | Impurities (%) K₂O |
|---|---|---|---|---|---|
| Kaolin A | 3.1 | 0.95 | 0.20 | 0.03 | 0.09 |
| Kaolin B | 3.0 | 0.98 | 0.20 | 0.03 | 0.09 |
| Kaolin C | 0.3 | 0.65 | 0.20 | 0.03 | 0.09 |

TABLE 3

| Starting Materials | Average Particle Size (μm) | d₉₀ (μm) | Particle Size Distribution Deviation SD [log (μm)] | Morphology Index |
|---|---|---|---|---|
| Talc A | 7.5 | 20.0 | 0.56 | 0.83 |
| Talc B | 7.5 | 20.0 | 0.56 | 0.77 |
| Talc C | 7.5 | 20.0 | 0.56 | 0.60 |
| Talc D | 1.0 | 10.0 | 0.55 | 0.83 |
| Talc E | 10.0 | 26.0 | 0.57 | 0.83 |
| Talc F | 7.5 | 23.0 | 0.70 | 0.83 |
| Talc G | 0.5 | 9.0 | 0.57 | 0.83 |
| Talc H | 17.0 | 65.0 | 0.90 | 0.84 |

| Starting Materials | Impurities (%) CaO | Impurities (%) Na₂O | Impurities (%) K₂O | Impurities (%) Fe₂O₃ |
|---|---|---|---|---|
| Talc A | 0.50 | 0.001 | 0.001 | 1.1 |
| Talc B | 0.51 | 0.001 | 0.001 | 1.1 |
| Talc C | 0.51 | 0.001 | 0.001 | 1.1 |
| Talc D | 0.52 | 0.001 | 0.001 | 1.1 |
| Talc E | 0.52 | 0.001 | 0.001 | 1.1 |
| Talc F | 0.52 | 0.001 | 0.001 | 1.0 |
| Talc G | 0.52 | 0.001 | 0.001 | 1.0 |
| Talc H | 0.51 | 0.001 | 0.001 | 1.0 |

TABLE 4

| Starting Materials | Average Particle Size (μm) | Impurities (%) CaO | Impurities (%) Na₂O | Impurities (%) K₂O |
|---|---|---|---|---|
| Alumina A | 6.1 | 0.001 | 0.30 | 0.001 |
| Alumina B | 4.2 | 0.001 | 0.31 | 0.001 |
| Aluminum Hydroxide | 1.8 | 0.001 | 0.05 | 0.001 |

TABLE 5

| Starting materials | Type | Average Particle Size (μm) | Percentage of Pores (%) 5 μm or less | Percentage of Pores (%) 80 μm or more |
|---|---|---|---|---|
| Pore-Forming Material A | Porous Polymer | 20.0 | 4.7 | 0.8 |
| Pore-Forming Material B | Porous Polymer | 15.0 | 6.5 | 0.3 |
| Pore-Forming Material C | Porous Polymer | 50.0 | 2.1 | 4.9 |
| Pore-Forming Material D | Porous Polymer | 20.1 | 8.0 | 4.5 |
| Pore-Forming Material E | Porous Polymer | 20.1 | 4.7 | 0.8 |
| Pore-Forming Material F | Porous Polymer | 20.1 | 4.7 | 0.8 |
| Pore-Forming Material G | Porous Polymer | 20.1 | 4.7 | 0.8 |
| Pore-Forming Material H | Porous Polymer | 20.0 | 4.7 | 0.8 |
| Pore-Forming Material I | Porous Polymer | 20.0 | 4.7 | 0.8 |
| Pore-Forming Material J | Porous Polymer | 60.0 | 1.1 | 8.5 |
| Pore-Forming Material K | Porous Polymer | 11.0 | 18.0 | 0.3 |
| Pore-Forming Material L | Porous Polymer | 20.0 | 11.0 | 6.0 |
| Pore-Forming Material M | Porous Polymer | 20.1 | 4.7 | 0.8 |
| Pore-Forming Material N | Porous Polymer | 20.1 | 4.7 | 0.8 |
| Pore-Forming Material O | Graphite | 20.0 | 10.0 | 5.0 |

TABLE 5-continued

| Starting Materials | | | | |
|---|---|---|---|---|
| Pore-Forming Material P | Foamed, Hollow Resin | 41.0 | 6.5 | 5.0 |

| Starting Materials | Particle Size Distribution Deviation SD [log (μm)] | Sphericity | Voids (%) | Water Content in Voids (% by volume) |
|---|---|---|---|---|
| Pore-Forming Material A | 0.32 | 0.92 | 45 | 91 |
| Pore-Forming Material B | 0.32 | 0.92 | 44 | 90 |
| Pore-Forming Material C | 0.32 | 0.91 | 44 | 90 |
| Pore-Forming Material D | 0.50 | 0.92 | 44 | 90 |
| Pore-Forming Material E | 0.32 | 0.91 | 30 | 90 |
| Pore-Forming Material F | 0.32 | 0.91 | 49 | 90 |
| Pore-Forming Material G | 0.32 | 0.91 | 45 | 80 |
| Pore-Forming Material H | 0.32 | 0.92 | 55 | 90 |
| Pore-Forming Material I | 0.32 | 0.92 | 45 | 50 |
| Pore-Forming Material J | 0.35 | 0.92 | 45 | 90 |
| Pore-Forming Material K | 0.36 | 0.92 | 45 | 90 |
| Pore-Forming Material L | 0.60 | 0.92 | 45 | 90 |
| pore-forming material M | 0.32 | 0.91 | 45 | 10 |
| Pore-Forming Material N | 0.32 | 0.91 | 45 | 0 |
| Pore-Forming Material O | 0.50 | 0.50 | — | — |
| Pore-Forming Material P | 0.40 | 0.91 | — | — |

TABLE 6

| No. | Silica Type | Silica Amount (%) | Kaolin Type | Kaolin Amount (%) |
|---|---|---|---|---|
| Example 1 | Silica A | 20.5 | Kaolin A | 6.0 |
| Example 2 | Silica B | 20.5 | Kaolin A | 6.0 |
| Example 3 | Silica C | 20.5 | Kaolin A | 6.0 |
| Example 4 | Silica D | 20.5 | Kaolin A | 6.0 |
| Example 5 | Silica E | 20.4 | Kaolin A | 6.0 |
| Example 6 | Silica E | 20.4 | Kaolin A | 6.0 |
| Example 7 | Silica E | 20.4 | Kaolin A | 6.0 |
| Example 8 | Silica E | 20.4 | Kaolin B | 6.0 |
| Example 9 | Silica E | 20.4 | Kaolin C | 6.0 |
| Example 10 | Silica E | 20.4 | Kaolin A | 6.0 |
| Example 11 | Silica E | 20.5 | Kaolin A | 6.0 |
| Example 12 | Silica E | 20.5 | Kaolin A | 6.0 |
| Example 13 | Silica E | 20.5 | Kaolin A | 6.0 |
| Example 14 | Silica E | 20.5 | Kaolin A | 6.0 |
| Example 15 | Silica E | 20.5 | Kaolin A | 6.0 |
| Example 16 | Silica E | 20.5 | Kaolin A | 6.0 |
| Example 17 | Silica E | 20.5 | Kaolin A | 6.0 |
| Example 18 | Silica E | 15.0 | Kaolin A | 12.4 |
| Example 19 | Silica E | 25.0 | Kaolin A | 1.0 |
| Example 20 | Silica E | 20.5 | Kaolin A | 6.0 |
| Example 21 | Silica E | 20.5 | Kaolin A | 6.0 |
| Example 22 | Silica E | 20.5 | Kaolin A | 6.0 |
| Example 23 | Silica E | 20.5 | Kaolin A | 6.0 |
| Example 24 | Silica E | 20.5 | Kaolin A | 6.0 |
| Example 25 | Silica E | 20.5 | Kaolin A | 6.0 |
| Example 26 | Silica E | 20.5 | Kaolin A | 6.0 |
| Comp. Ex. 1 | Silica F | 20.5 | Kaolin A | 6.0 |
| Comp. Ex. 2 | Silica G | 20.5 | Kaolin A | 6.0 |
| Comp. Ex. 3 | Silica H | 20.5 | Kaolin A | 6.0 |
| Comp. Ex. 4 | Silica E | 20.5 | Kaolin A | 6.0 |
| Comp. Ex. 5 | Silica E | 20.5 | Kaolin A | 6.0 |
| Comp. Ex. 6 | Silica E | 20.5 | Kaolin A | 6.0 |
| Comp. Ex. 7 | Silica E | 13.0 | Kaolin A | 15.0 |
| Comp. Ex. 8 | Silica E | 28.0 | Kaolin A | 0.8 |
| Comp. Ex. 9 | Silica I | 18.0 | Kaolin A | 6.0 |

| No. | Talc Type | Talc Amount (%) | Alumina Type | Alumina Amount (%) |
|---|---|---|---|---|
| Example 1 | Talc A | 42 | Alumina A | 31.5 |
| Example 2 | Talc A | 42 | Alumina A | 31.5 |
| Example 3 | Talc A | 42 | Alumina A | 31.5 |
| Example 4 | Talc A | 42 | Alumina A | 31.5 |
| Example 5 | Talc B | 42 | Alumina B | 31.6 |
| Example 6 | Talc C | 42 | Alumina B | 31.6 |
| Example 7 | Talc A | 42 | Alumina B | 31.6 |
| Example 8 | Talc A | 42 | Alumina B | 31.6 |
| Example 9 | Talc A | 42 | Alumina B | 31.6 |
| Example 10 | Talc A | 42 | Alumina B | 31.6 |
| Example 11 | Talc A | 42 | Alumina A | 31.5 |
| Example 12 | Talc D | 42 | Alumina A | 31.5 |
| Example 13 | Talc E | 42 | Alumina A | 31.5 |
| Example 14 | Talc F | 42 | Alumina A | 31.5 |
| Example 15 | Talc G | 42 | Alumina A | 31.5 |
| Example 16 | Talc A | 42 | Alumina A | 31.5 |
| Example 17 | Talc A | 42 | Alumina A | 31.5 |
| Example 18 | Talc A | 43 | Alumina A | 29.6 |
| Example 19 | Talc A | 40 | Alumina A | 34.0 |
| Example 20 | Talc A | 40 | Alumina A | 23.0 |
| Example 21 | Talc A | 42 | Alumina A | 31.5 |
| Example 22 | Talc A | 42 | Alumina A | 31.5 |
| Example 23 | Talc A | 42 | Alumina A | 31.5 |
| Example 24 | Talc A | 42 | Alumina A | 31.5 |
| Example 25 | Talc A | 42 | Alumina A | 31.5 |
| Example 26 | Talc A | 42 | Alumina A | 31.5 |
| Comp. Ex. 1 | Talc A | 42 | Alumina A | 31.5 |
| Comp. Ex. 2 | Talc A | 42 | Alumina A | 31.5 |
| Comp. Ex. 3 | Talc A | 42 | Alumina A | 31.5 |
| Comp. Ex. 4 | Talc A | 42 | Alumina A | 31.5 |
| Comp. Ex. 5 | Talc A | 42 | Alumina A | 31.5 |
| Comp. Ex. 6 | Talc A | 42 | Alumina A | 31.5 |
| Comp. Ex. 7 | Talc A | 45 | Alumina A | 27.0 |
| Comp. Ex. 8 | Talc A | 37.7 | Alumina A | 33.5 |
| Comp. Ex. 9 | Talc H | 41.4 | Alumina A | 23.3 |

| No. | Aluminum Hydroxide Amount (%) | Pore-Forming Material Type | Pore-Forming Material Amount (%) |
|---|---|---|---|
| Example 1 | 0.0 | A | 10.0 |
| Example 2 | 0.0 | A | 10.0 |
| Example 3 | 0.0 | A | 10.0 |
| Example 4 | 0.0 | A | 10.0 |
| Example 5 | 0.0 | B | 10.0 |
| Example 6 | 0.0 | C | 10.0 |
| Example 7 | 0.0 | D | 10.0 |
| Example 8 | 0.0 | E | 10.0 |
| Example 9 | 0.0 | F | 10.0 |
| Example 10 | 0.0 | G | 10.0 |
| Example 11 | 0.0 | A | 10.0 |
| Example 12 | 0.0 | A | 10.0 |
| Example 13 | 0.0 | A | 10.0 |
| Example 14 | 0.0 | A | 10.0 |
| Example 15 | 0.0 | A | 10.0 |
| Example 16 | 0.0 | H | 10.0 |
| Example 17 | 0.0 | I | 10.0 |
| Example 18 | 0.0 | A | 10.0 |
| Example 19 | 0.0 | A | 10.0 |
| Example 20 | 10.5 | A | 10.0 |
| Example 21 | 0.0 | O | 20.0 |
| Example 22 | 0.0 | A | 5.0 |
| Example 23 | 0.0 | A | 15.0 |
| Example 24 | 0.0 | A | 25.0 |
| Example 25 | 0.0 | M | 10.0 |
| Example 26 | 0.0 | N | 10.0 |
| Comp. Ex. 1 | 0.0 | A | 10.0 |
| Comp. Ex. 2 | 0.0 | A | 10.0 |

TABLE 6-continued

| | | | |
|---|---|---|---|
| Comp. Ex. 3 | 0.0 | A | 10.0 |
| Comp. Ex. 4 | 0.0 | J | 10.0 |
| Comp. Ex. 5 | 0.0 | K | 10.0 |
| Comp. Ex. 6 | 0.0 | L | 10.0 |
| Comp. Ex. 7 | 0.0 | A | 10.0 |
| Comp. Ex. 8 | 0.0 | A | 10.0 |
| Comp. Ex. 9 | 11.3 | P | 7.0 |

TABLE 7

Pores Opening on Cell Wall Surface

| No. | Opening Area Ratio (%) | Median Opening Diameter (μm) | Pores of 10 μm or More and Less Than 40 μm Density (/mm²) | Average Circularity |
|---|---|---|---|---|
| Example 1 | 53.4 | 30.0 | 720 | 1.33 |
| Example 2 | 15.1 | 14.0 | 890 | 1.33 |
| Example 3 | 47.4 | 30.0 | 610 | 1.33 |
| Example 4 | 19.3 | 19.0 | 620 | 1.90 |
| Example 5 | 15.6 | 13.5 | 990 | 1.40 |
| Example 6 | 49.2 | 39.5 | 365 | 1.40 |
| Example 7 | 32.7 | 29.0 | 450 | 1.45 |
| Example 8 | 25.1 | 21.5 | 630 | 1.40 |
| Example 9 | 16.4 | 18.4 | 560 | 1.45 |
| Example 10 | 27.4 | 22.0 | 655 | 1.40 |
| Example 11 | 27.6 | 22.0 | 660 | 1.33 |
| Example 12 | 17.6 | 16.5 | 750 | 1.45 |
| Example 13 | 40.6 | 28.0 | 600 | 1.50 |
| Example 14 | 17.1 | 18.0 | 610 | 1.45 |
| Example 15 | 15.0 | 16.0 | 680 | 1.30 |
| Example 16 | 15.2 | 15.0 | 780 | 1.32 |
| Example 17 | 15.6 | 17.0 | 625 | 1.34 |
| Example 18 | 15.5 | 20.0 | 450 | 1.34 |
| Example 19 | 32.2 | 23.0 | 705 | 1.34 |
| Example 20 | 27.1 | 22.5 | 620 | 1.33 |
| Example 21 | 20.9 | 21.0 | 550 | 2.00 |
| Example 22 | 15.2 | 19.8 | 450 | 1.33 |
| Example 23 | 37.2 | 23.0 | 815 | 1.33 |
| Example 24 | 43.1 | 24.5 | 832 | 1.35 |
| Example 25 | 16.9 | 18.0 | 605 | 1.55 |
| Example 26 | 17.6 | 18.5 | 595 | 1.65 |
| Comp. Ex. 1 | 52.1 | 46.0 | 285 | 1.45 |
| Comp. Ex. 2 | 3.5 | 9.5 | 450 | 1.44 |
| Comp. Ex. 3 | 58.8 | 41.0 | 405 | 1.45 |
| Comp. Ex. 4 | 62.8 | 50.5 | 285 | 1.50 |
| Comp. Ex. 5 | 2.1 | 9.0 | 295 | 1.50 |
| Comp. Ex. 6 | 13.8 | 22.0 | 330 | 2.10 |
| Comp. Ex. 7 | 12.0 | 21.0 | 315 | 1.34 |
| Comp. Ex. 8 | 41.4 | 25.8 | 721 | 1.38 |
| Comp. Ex. 9 | 33.6 | 34.1 | 335 | 3.40 |

Pores Measured By Mercury Porosimetry

| No. | Total Pore Volume (cm³/g) | Porosity (%) | Median Pore Diameter (μm) |
|---|---|---|---|
| Example 1 | 0.530 | 57.2 | 18.0 |
| Example 2 | 0.295 | 42.6 | 7.5 |
| Example 3 | 0.430 | 52.0 | 8.7 |
| Example 4 | 0.460 | 53.7 | 8.6 |
| Example 5 | 0.290 | 42.2 | 5.8 |
| Example 6 | 0.585 | 59.6 | 19.5 |
| Example 7 | 0.405 | 50.5 | 8.9 |
| Example 8 | 0.450 | 53.1 | 8.5 |
| Example 9 | 0.315 | 44.3 | 6.9 |
| Example 10 | 0.460 | 53.7 | 8.5 |
| Example 11 | 0.470 | 54.2 | 8.7 |
| Example 12 | 0.290 | 42.2 | 6.0 |
| Example 13 | 0.445 | 52.9 | 10.5 |
| Example 14 | 0.350 | 46.9 | 8.6 |
| Example 15 | 0.275 | 40.9 | 5.5 |
| Example 16 | 0.295 | 42.6 | 5.9 |
| Example 17 | 0.461 | 53.7 | 8.5 |
| Example 18 | 0.295 | 42.6 | 9.0 |
| Example 19 | 0.490 | 55.3 | 15.0 |
| Example 20 | 0.470 | 54.2 | 8.9 |
| Example 21 | 0.470 | 54.2 | 8.7 |
| Example 22 | 0.285 | 41.8 | 6.5 |
| Example 23 | 0.485 | 55.0 | 15.0 |
| Example 24 | 0.575 | 59.2 | 15.0 |
| Example 25 | 0.441 | 52.6 | 8.0 |
| Example 26 | 0.431 | 52.1 | 7.5 |
| Comp. Ex. 1 | 0.585 | 59.6 | 21.0 |
| Comp. Ex. 2 | 0.280 | 41.4 | 4.5 |
| Comp. Ex. 3 | 0.490 | 55.3 | 11.0 |
| Comp. Ex. 4 | 0.695 | 63.7 | 29.0 |
| Comp. Ex. 5 | 0.250 | 38.7 | 4.0 |
| Comp. Ex. 6 | 0.510 | 56.2 | 18.0 |
| Comp. Ex. 7 | 0.260 | 39.6 | 8.5 |
| Comp. Ex. 8 | 0.620 | 61.0 | 16.0 |
| Comp. Ex. 9 | 0.655 | 62.3 | 23.0 |

Pores Measured By Mercury Porosimetry

| No. | Volume Percentage of Pores (%) less than 2 μm | Volume Percentage of Pores (%) 40 μm or more | Pore Size Distribution Deviation σ |
|---|---|---|---|
| Example 1 | 1.0 | 9.0 | 0.35 |
| Example 2 | 6.5 | 2.0 | 0.34 |
| Example 3 | 2.0 | 5.0 | 0.48 |
| Example 4 | 3.5 | 4.0 | 0.35 |
| Example 5 | 8.5 | 3.0 | 0.42 |
| Example 6 | 1.1 | 9.7 | 0.42 |
| Example 7 | 5.0 | 8.0 | 0.49 |
| Example 8 | 3.6 | 4.0 | 0.36 |
| Example 9 | 3.0 | 3.0 | 0.41 |
| Example 10 | 3.6 | 4.1 | 0.35 |
| Example 11 | 3.5 | 4.0 | 0.35 |
| Example 12 | 3.5 | 4.0 | 0.46 |
| Example 13 | 2.0 | 8.0 | 0.46 |
| Example 14 | 4.0 | 8.2 | 0.48 |
| Example 15 | 4.0 | 3.5 | 0.45 |
| Example 16 | 3.9 | 2.7 | 0.40 |
| Example 17 | 3.1 | 4.2 | 0.35 |
| Example 18 | 3.5 | 4.0 | 0.48 |
| Example 19 | 1.5 | 8.5 | 0.46 |
| Example 20 | 3.9 | 4.5 | 0.43 |
| Example 21 | 3.5 | 4.0 | 0.50 |
| Example 22 | 5.5 | 2.0 | 0.41 |
| Example 23 | 1.5 | 7.0 | 0.42 |
| Example 24 | 1.2 | 9.0 | 0.50 |
| Example 25 | 4.0 | 3.2 | 0.56 |
| Example 26 | 4.5 | 2.5 | 0.60 |
| Comp. Ex. 1 | 3.5 | 11.0 | 0.54 |
| Comp. Ex. 2 | 23.0 | 2.0 | 0.47 |
| Comp. Ex. 3 | 4.0 | 8.0 | 0.62 |
| Comp. Ex. 4 | 0.7 | 19.0 | 0.42 |
| Comp. Ex. 5 | 26.0 | 1.5 | 0.46 |
| Comp. Ex. 6 | 6.0 | 8.0 | 0.47 |
| Comp. Ex. 7 | 3.5 | 4.0 | 0.43 |
| Comp. Ex. 8 | 1.6 | 9.0 | 0.55 |
| Comp. Ex. 9 | 2.1 | 23.0 | 0.51 |

| No. | Honeycomb Structure Wall Thickness (mil) | Honeycomb Structure Cell Density (cpsi) | Darcy's Coefficient of Permeability (×10⁻¹² m²) | CTE Between 20° C. And 800° C. (×10⁻⁷/° C.) |
|---|---|---|---|---|
| Example 1 | 12 | 260 | 0.70 | 8.0 |
| Example 2 | 12 | 260 | 0.60 | 8.0 |
| Example 3 | 12 | 260 | 0.40 | 7.5 |
| Example 4 | 12 | 260 | 0.48 | 7.8 |
| Example 5 | 12 | 260 | 0.15 | 9.1 |
| Example 6 | 12 | 260 | 1.90 | 12.2 |
| Example 7 | 12 | 260 | 0.70 | 8.0 |
| Example 8 | 12 | 260 | 0.55 | 6.5 |
| Example 9 | 12 | 260 | 0.35 | 11.5 |
| Example 10 | 12 | 260 | 0.55 | 8.0 |
| Example 11 | 12 | 260 | 0.55 | 7.5 |
| Example 12 | 12 | 260 | 0.35 | 8.1 |
| Example 13 | 12 | 260 | 0.80 | 8.1 |

TABLE 7-continued

| | | | | |
|---|---|---|---|---|
| Example 14 | 12 | 260 | 0.50 | 7.9 |
| Example 15 | 12 | 260 | 0.36 | 8.0 |
| Example 16 | 12 | 260 | 0.35 | 7.9 |
| Example 17 | 12 | 260 | 0.55 | 8.0 |
| Example 18 | 12 | 260 | 0.16 | 5.5 |
| Example 19 | 12 | 260 | 1.70 | 13.0 |
| Example 20 | 12 | 260 | 0.55 | 7.5 |
| Example 21 | 12 | 260 | 0.55 | 7.5 |
| Example 22 | 12 | 260 | 0.35 | 7.5 |
| Example 23 | 12 | 260 | 1.80 | 7.5 |
| Example 24 | 12 | 260 | 1.80 | 7.5 |
| Example 25 | 12 | 260 | 0.65 | 9.0 |
| Example 26 | 12 | 260 | 0.70 | 9.5 |
| Comp. Ex. 1 | 12 | 260 | 2.20 | 7.9 |
| Comp. Ex. 2 | 12 | 260 | 0.05 | 7.9 |
| Comp. Ex. 3 | 12 | 260 | 1.00 | 7.8 |
| Comp. Ex. 4 | 12 | 260 | 2.50 | 7.8 |
| Comp. Ex. 5 | 12 | 260 | 0.05 | 7.8 |
| Comp. Ex. 6 | 12 | 260 | 0.70 | 8.0 |
| Comp. Ex. 7 | 12 | 260 | 0.04 | 7.9 |
| Comp. Ex. 8 | 12 | 260 | 1.70 | 14.5 |
| Comp. Ex. 9 | 12 | 260 | 3.50 | 7.0 |

| | Evaluation Results | | |
|---|---|---|---|
| No. | Initial Pressure Loss (kPa) | Pressure Loss When 2 g/L of Soot Was Captured (kPa) | Capturing Efficiency |
| Example 1 | 0.5 Excellent | 1.1 Excellent | 97.0 Good |
| Example 2 | 1.0 Good | 1.3 Good | 98.3 Excellent |
| Example 3 | 0.7 Excellent | 1.2 Excellent | 97.0 Good |
| Example 4 | 0.7 Excellent | 1.4 Good | 98.0 Excellent |
| Example 5 | 1.0 Good | 1.5 Good | 95.5 Good |
| Example 6 | 0.4 Excellent | 1.0 Excellent | 95.0 Good |
| Example 7 | 0.7 Excellent | 1.2 Excellent | 95.5 Good |
| Example 8 | 0.7 Excellent | 1.3 Good | 97.0 Good |
| Example 9 | 0.8 Good | 1.4 Good | 95.5 Good |
| Example 10 | 0.7 Excellent | 1.2 Excellent | 99.5 Excellent |
| Example 11 | 0.7 Excellent | 1.2 Excellent | 99.5 Excellent |
| Example 12 | 0.8 Good | 1.5 Good | 98.5 Excellent |
| Example 13 | 0.7 Excellent | 1.1 Excellent | 97.5 Good |
| Example 14 | 0.8 Good | 1.4 Good | 98.0 Excellent |
| Example 15 | 1.0 Good | 1.5 Good | 98.5 Excellent |
| Example 16 | 1.0 Good | 1.5 Good | 99.0 Excellent |
| Example 17 | 0.7 Excellent | 1.3 Good | 99.5 Excellent |
| Example 18 | 1.0 Good | 1.3 Good | 99.5 Excellent |
| Example 19 | 0.5 Excellent | 1.2 Excellent | 95.5 Good |
| Example 20 | 0.6 Excellent | 1.2 Excellent | 98.8 Excellent |
| Example 21 | 0.7 Excellent | 1.3 Good | 95.5 Good |
| Example 22 | 0.8 Good | 1.3 Good | 99.6 Excellent |
| Example 23 | 0.5 Excellent | 1.1 Excellent | 96.5 Good |
| Example 24 | 0.4 Excellent | 1.0 Excellent | 95.5 Good |
| Example 25 | 0.8 Good | 1.3 Good | 99.5 Excellent |
| Example 26 | 0.8 Good | 1.4 Good | 99.5 Excellent |
| Comp. Ex. 1 | 0.6 Excellent | 1.1 Excellent | 92.0 Poor |
| Comp. Ex. 2 | 1.1 Poor | 1.9 Poor | 99.0 Excellent |
| Comp. Ex. 3 | 0.7 Excellent | 1.1 Excellent | 93.0 Poor |
| Comp. Ex. 4 | 0.4 Excellent | 1.1 Excellent | 89.0 Poor |
| Comp. Ex. 5 | 1.3 Poor | 1.9 Poor | 97.0 Excellent |
| Comp. Ex. 6 | 0.7 Excellent | 1.6 Poor | 92.0 Poor |
| Comp. Ex. 7 | 1.4 Poor | 1.7 Poor | 99.5 Excellent |
| Comp. Ex. 8 | 0.4 Excellent | 1.1 Excellent | 94.5 Poor |
| Comp. Ex. 9 | 0.4 Excellent | 1.5 Good | 91.0 Poor |

It is clear from Table 7 that the ceramic honeycomb filters of Examples 1-26 within the present invention have improved PM-capturing ratios at an early stage of capturing after regeneration, while keeping low pressure loss. Among them, the ceramic honeycomb filters of Examples 17, 25 and 26 produced by using porous pore-forming materials having water contents of 50%, 10% and 0%, respectively, had improved PM-capturing ratios at an early stage of capturing after regeneration while keeping low pressure loss, but their extrudates were deformed because of high pressure during extrusion molding, and the molding die was also deformed. Particularly in Example 26 using a porous pore-forming material having a water content of 0%, the die was largely deformed, making the subsequent extrusion molding impossible.

On the other hand, the ceramic honeycomb filters of Comparative Examples 1 and 4, in which pores opening on the cell wall surface had large median opening diameters, and in which pores of 10 μm or more and less than 40 μm had a low density, had low capturing efficiency. The ceramic honeycomb filters of Comparative Examples 2 and 5, in which pores opening on the cell wall surface had small opening area ratios and median opening diameters, suffered large initial pressure loss and large pressure loss when 2 g/L of soot was captured. The ceramic honeycomb filter of Comparative Example 5 having pores of 10 μm or more and less than 40 μm in a low density exhibited slightly lower capturing efficiency than that of the ceramic honeycomb filter of Comparative Example 2. The ceramic honeycomb filter of Comparative Example 3, in which pores opening on the cell wall surface had large median opening diameters, exhibited low capturing efficiency. The ceramic honeycomb filter of Comparative Example 6, in which pores opening on the cell wall surface had a low opening area ratio, and in which pores of 10 μm or more and less than 40 μm had a low density and large average circularity, suffered large pressure loss when 2 g/L of soot was captured, and low capturing efficiency.

The ceramic honeycomb filter of Comparative Example 7, in which pores opening on the cell wall surface had a low opening area ratio, and in which pores of 10 μm or more and less than 40 μm had a low density, suffered large initial pressure loss, and large pressure loss when 2 g/L of soot was captured. The ceramic honeycomb filter of Comparative Example 8 having porosity exceeding 60% suffered low capturing efficiency with a large thermal expansion coefficient. The ceramic honeycomb filter of Comparative Example 9, in which pores of 10 μm or more and less than 40 μm had a low density and large average circularity, suffered slightly large pressure loss when 2 g/L of soot was captured, and low capturing efficiency.

Effect of the Invention

Because the ceramic honeycomb structures of the present invention have improved PM-capturing ratios at an early stage of capturing after regeneration while keeping low pressure loss, they can efficiently capture nano-sized PM which should be reduced under increasingly stricter exhaust gas regulations, thereby solving the problems that harmful nano-sized PM is discharged.

What is claimed is:

1. A method for producing a honeycomb-shaped ceramic structure by extrusion-molding a moldable material comprising a cordierite-forming material and a pore-forming material,
    said cordierite-forming material containing 15-25% by mass of silica;
    said silica having an average particle size of 20-30 μm with 5% or less by mass of particles having particle sizes of 10 μm or less, and 5% or less by mass of particles having particle sizes of 100 μm or more, a particle size distribution deviation SD of 0.5 or less, and sphericity of 0.5 or more;
    the amount of said pore-forming material being 5-40% by mass based on the cordierite-forming material; and
    said pore-forming material having an average particle size of 15-50 μm with 10% or less by mass of particles having particle sizes of 5 μm or less, and 5% or less by mass of particles having particle sizes of 80 μm or more, a particle size distribution deviation SD=log $(d_{80})$−log$(d_{20})$ of 0.5 or less, and sphericity of 0.5 or more, wherein $d_{20}$ represents a particle size (m) at a cumulative volume corresponding to 20% of the total volume, and $d_{80}$ similarly represents a particle size (μm) at a cumulative volume corresponding to 80% of the total volume, on a curve showing the relation between a particle size and a cumulative volume of particles having a particular particle size or less, and $d_{20}<d_{80}$.

2. The method for producing a ceramic honeycomb structure according to claim 1, wherein said pore-forming material is a porous polymer, and wherein said pore-forming material particles contain 30% or more and less than 50% of voids.

3. The method for producing a ceramic honeycomb structure according to claim 2, wherein 80% or more of voids in said pore-forming material particles contain water.

4. The method for producing a ceramic honeycomb structure according to claim 3, wherein said cordierite-forming material contains 40-43% by mass of talc, and wherein said talc has an average particle size of 1-10 μm, $d_{90}$ of 30 μm or less, wherein $d_{90}$ is a particle size at a cumulative volume corresponding to 90% of the total volume on a curve showing the relation between a particle size and a cumulative volume of particles having a particular particle size or less, and a particle size distribution deviation SD of 0.7 or less.

5. The method for producing a ceramic honeycomb structure according to claim 4, wherein said talc particles have a morphology index (indicating the degree of platelikeness) of 0.77 or more.

6. The method for producing a ceramic honeycomb structure according to claim 3, wherein said cordierite-forming material contains talc particles, and
wherein said talc particles have a morphology index (indicating the degree of platelikeness) of 0.77 or more.

7. The method for producing a ceramic honeycomb structure according to claim 2, wherein said cordierite-forming material contains 40-43% by mass of talc, and wherein said talc has an average particle size of 1-10 μm, $d_{90}$ of 30 μm or less, wherein $d_{90}$ is a particle size at a cumulative volume corresponding to 90% of the total volume on a curve showing the relation between a particle size and a cumulative volume of particles having a particular particle size or less, and a particle size distribution deviation SD of 0.7 or less.

8. The method for producing a ceramic honeycomb structure according to claim 7, wherein said talc particles have a morphology index (indicating the degree of platelikeness) of 0.77 or more.

9. The method for producing a ceramic honeycomb structure according to claim 2, wherein said cordierite-forming material contains talc particles, and
wherein said talc particles have a morphology index (indicating the degree of platelikeness) of 0.77 or more.

10. The method for producing a ceramic honeycomb structure according to claim 1, wherein said cordierite-forming material contains 40-43% by mass of talc, and wherein said talc has an average particle size of 1-10 $d_{90}$ of 30 μm or less, wherein $d_{90}$ is a particle size at a cumulative volume corresponding to 90% of the total volume on a curve showing the relation between a particle size and a cumulative volume of particles having a particular particle size or less, and a particle size distribution deviation SD of 0.7 or less.

11. The method for producing a ceramic honeycomb structure according to claim 10, wherein said talc particles have a morphology index (indicating the degree of platelikeness) of 0.77 or more.

12. The method for producing a ceramic honeycomb structure according to claim 1, wherein said cordierite-forming material contains talc particles, and
wherein said talc particles have a morphology index (indicating the degree of platelikeness) of 0.77 or more.

* * * * *